US010509712B2

(12) United States Patent
Harutyunyan et al.

(10) Patent No.: US 10,509,712 B2
(45) Date of Patent: Dec. 17, 2019

(54) METHODS AND SYSTEMS TO DETERMINE BASELINE EVENT-TYPE DISTRIBUTIONS OF EVENT SOURCES AND DETECT CHANGES IN BEHAVIOR OF EVENT SOURCES

(71) Applicant: VMware, Inc., Palo Alto, CA (US)

(72) Inventors: Ashot Nshan Harutyunyan, Yerevan (AM); Arnak Poghosyan, Yerevan (AM); Nicholas Kushmerick, Yerevan (AM); Naira Movses Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 190 days.

(21) Appl. No.: 15/828,227

(22) Filed: Nov. 30, 2017

(65) Prior Publication Data

US 2019/0163598 A1 May 30, 2019

(51) Int. Cl.
| | |
|---|---|
| *G06F 21/55* | (2013.01) |
| *G06F 11/30* | (2006.01) |
| *G06F 9/54* | (2006.01) |
| *H04L 12/24* | (2006.01) |
| *H04L 12/26* | (2006.01) |

(52) U.S. Cl.
CPC ......... *G06F 11/3072* (2013.01); *G06F 9/542* (2013.01); *G06F 11/3006* (2013.01); *G06F 21/552* (2013.01); *H04L 41/0681* (2013.01); *H04L 41/0622* (2013.01); *H04L 41/145* (2013.01); *H04L 43/067* (2013.01)

(58) Field of Classification Search
CPC ............ G06F 21/20; G06F 21/55–554; G06F 21/577; G06F 11/3006; G06F 11/3072; H04L 63/1425; H04L 41/0622; H04L 41/0681; H04L 41/145
See application file for complete search history.

(56) References Cited

U.S. PATENT DOCUMENTS

| | | | |
|---|---|---|---|
| 2012/0137367 A1* | 5/2012 | Dupont ................... | G06F 21/00 726/25 |
| 2016/0277268 A1* | 9/2016 | Brown ..................... | H04L 67/10 |
| 2019/0026459 A1* | 1/2019 | Harutyunyan .......... | G06F 21/50 |

* cited by examiner

*Primary Examiner* — Minh Dinh

(57) ABSTRACT

Automated methods and systems to determine a baseline event-type distribution of an event source and use the baseline event type distribution to detect changes in the behavior of the event source are described. In one implementation, blocks of event messages generated by the event source are collected and an event-type distribution is computed for each of block of event messages. Candidate baseline event-type distributions are determined from the event-type distributions. The candidate baseline event-type distribution has the largest entropy of the event-type distributions. A normal discrepancy radius of the event-type distributions is computed from the baseline event-type distribution and the event-type distributions. A block of run-time event messages generated by the event source is collected. A run-time event-type distribution is computed from the block of run-time event messages. When the run-time event-type distribution is outside the normal discrepancy radius, an alert is generated indicating abnormal behavior of the event source.

19 Claims, 22 Drawing Sheets

|     | $ET_2$ | $ET_3$ | $ET_4$ | ... | $ET_N$ |
|-----|--------|--------|--------|-----|--------|
| $ET_1$ | $Sim(ET_1,ET_2)$ | $Sim(ET_1,ET_3)$ | $Sim(ET_1,ET_4)$ | ... | $Sim(ET_1,ET_N)$ |
| $ET_2$ |  | $Sim(ET_2,ET_3)$ | $Sim(ET_2,ET_4)$ | ... | $Sim(ET_2,ET_N)$ |
| $ET_3$ |  |  | $Sim(ET_3,ET_4)$ | ... | $Sim(ET_3,ET_N)$ |
| ⋮ |  |  |  | ⋱ | ⋮ |
| $ET_{N-1}$ |  |  |  |  | $Sim(ET_{N-1},ET_N)$ |

|     | $ET_1$ | $ET_2$ | $ET_3$ | $\cdots$ | $ET_N$ |
| --- | --- | --- | --- | --- | --- |
| $ET_1$ | 0 | $Dist(ET_2, ET_1)$ | $Dist(ET_3, ET_1)$ | $\cdots$ | $Dist(ET_N, ET_1)$ |
| $ET_2$ | $Dist(ET_1, ET_2)$ | 0 | $Dist(ET_3, ET_2)$ | $\cdots$ | $Dist(ET_N, ET_2)$ |
| $ET_3$ | $Dist(ET_1, ET_3)$ | $Dist(ET_2, ET_3)$ | 0 | $\cdots$ | $Dist(ET_N, ET_3)$ |
| $\vdots$ | $\vdots$ | $\vdots$ | $\vdots$ | | $\vdots$ |
| $ET_N$ | $Dist(ET_1, ET_N)$ | $Dist(ET_2, ET_N)$ | $Dist(ET_3, ET_N)$ | $\cdots$ | 0 |
| | $\downarrow$ | $\downarrow$ | $\downarrow$ | | $\downarrow$ |
| | $\mu(ET_1)$ | $\mu(ET_2)$ | $\mu(ET_3)$ | $\cdots$ | $\mu(ET_N)$ |

FIG. 14

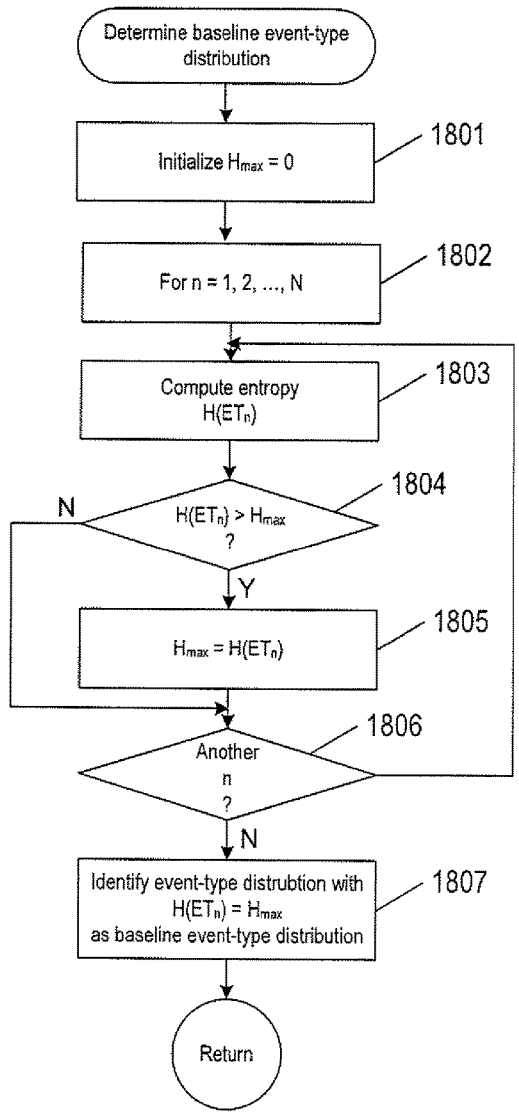
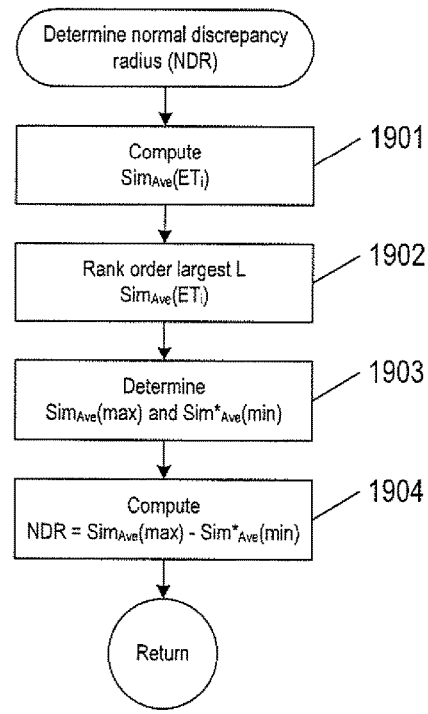
FIG. 18
FIG. 19

METHODS AND SYSTEMS TO DETERMINE BASELINE EVENT-TYPE DISTRIBUTIONS OF EVENT SOURCES AND DETECT CHANGES IN BEHAVIOR OF EVENT SOURCES

TECHNICAL FIELD

This disclosure is directed to automated computational systems and methods to compute baseline event-type distributions for event sources and use the baseline event-type distributions to detect and report changes in behavior of event sources.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are sent to a log management server that records the event messages in event logs that are in turn stored as files in data-storage appliances. Log management servers are typically used to determine the types of events recorded in the event messages, but log management servers currently lack the ability to detect anomalous behavior of an event source from the many thousands, if not millions, of event messages generated by the event source. System administrators seek methods and systems that automatically detect anomalous states of event sources based on the event messages generated by the event sources.

SUMMARY

This disclosure describes automated computational methods and systems to determine a baseline event-type distribution of an event source and use the baseline event type distribution to detect changes in the behavior of the event source. In one implementation, blocks of event messages generated by the event source are collected and an event-type distribution is computed for each of block of event messages. Candidate baseline event-type distribution of the event-type distributions are identified. The baseline event-type distribution has the largest entropy of the candidate baseline event-type distributions. A normal discrepancy radius of the event-type distributions is computed from the baseline event-type distribution and the event-type distributions. A block of run-time event messages generated by the event source is collected. A run-time event-type distribution is computed from the block of run-time event messages. When the run-time event-type distribution is outside the normal discrepancy radius, an alert is generated indicating abnormal behavior of the event source.

DESCRIPTION OF THE DRAWINGS

FIG. 14 shows a matrix of distances computed between pairs of event-type distribution.

FIG. 18 shows a control-flow diagram of the routine "determine baseline event-type distribution" called in FIG. 17.

FIG. 19 shows a control-flow diagram of the routine "determine normal discrepancy radius" called in FIG. 17.

DETAILED DESCRIPTION

This disclosure presents automated computational methods and systems to determine a baseline event-type distribution of event messages and detect abnormal behavior of an event source based on the baseline event-type distribution. In a first subsection, logging event messages in event logs is described in a first subsection are described. Methods to determine baseline event-type distributions and detect abnormal behavior of event sources are described in a second subsection.

Logging Event Messages in Event Logs and Determining Event Types

Figure 1:
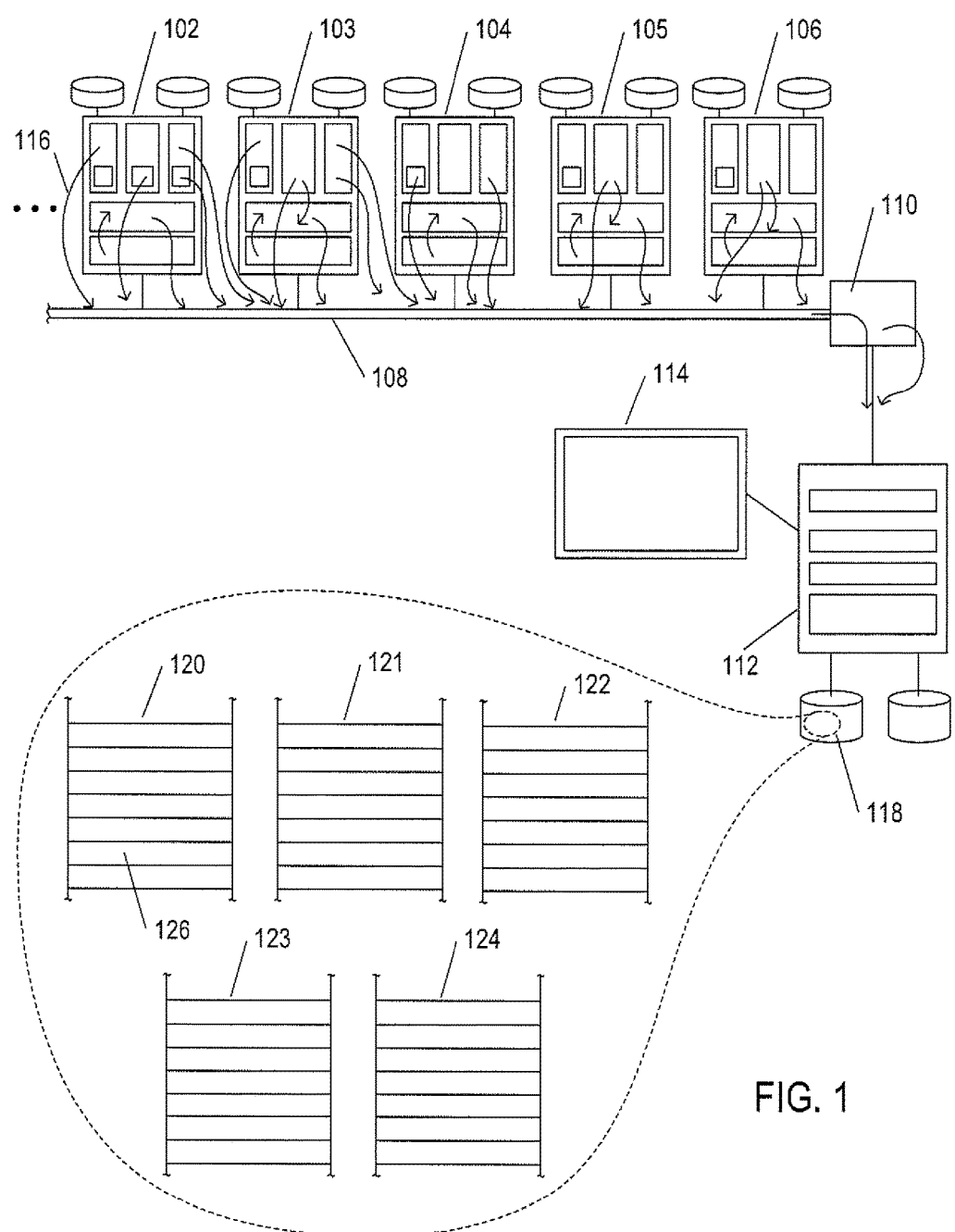
FIG. 1 shows an example of logging event messages in event logs.

FIG. 1 shows an example of logging event messages in event logs. In FIG. 1, a number of computer systems 102-106 within a distributed computing system are linked together by an electronic communications medium 108 and additionally linked through a communications bridge/router 110 to an administration computer system 112 that includes an administrative console 114. One or more of the computer systems 102-106 may run a log monitoring agent that collects and forwards event messages to a log management server that runs on the administration console 114. As indicated by curved arrows, such as curved arrow 116, multiple components within each of the discrete computer systems 102-106 as well as the communications bridge/router 110 generate event messages that are forwarded to the log management server. Event messages may be generated by any event source. Event sources may be, but are not limited to, application programs, operating systems, VMs, guest operating systems, containers, network devices, machine codes, event channels, and other computer programs or processes running on the computer systems 102-106, the bridge/router 110 and any other components of the distributed computing system. Event messages may be collected at various hierarchical levels within a discrete computer system and then forwarded to the log management server in the administration computer 112. For example, a log monitoring agent may collect and forward the event messages at various hierarchical levels. The log management server in the administration computer 112 collects and stores the received event messages in a data-storage device or appliance 118 as event logs 120-124. Rectangles, such as rectangle 126, represent individual event messages. For example, event log 120 may comprise a list of event messages generated within the computer system 102. Each log monitoring agent has an agent monitoring configuration that includes a log path and a log parser. The log path specifies a unique file system path in terms of a directory tree hierarchy that identifies the storage location of an event log associated with the event source on the administrative console 114 or the data-storage device or appliance 118. The log monitoring agent receives specific file and event channel log paths to monitor event logs and the log parser includes log parsing rules to extract and format lines of event message into event message fields. The log monitoring agent then sends the constructed structured event messages to the log management server. The administrative console 114 and computer systems 102-106 can function without log management agents and a log management server, but with less precision and certainty.

Figure 2:
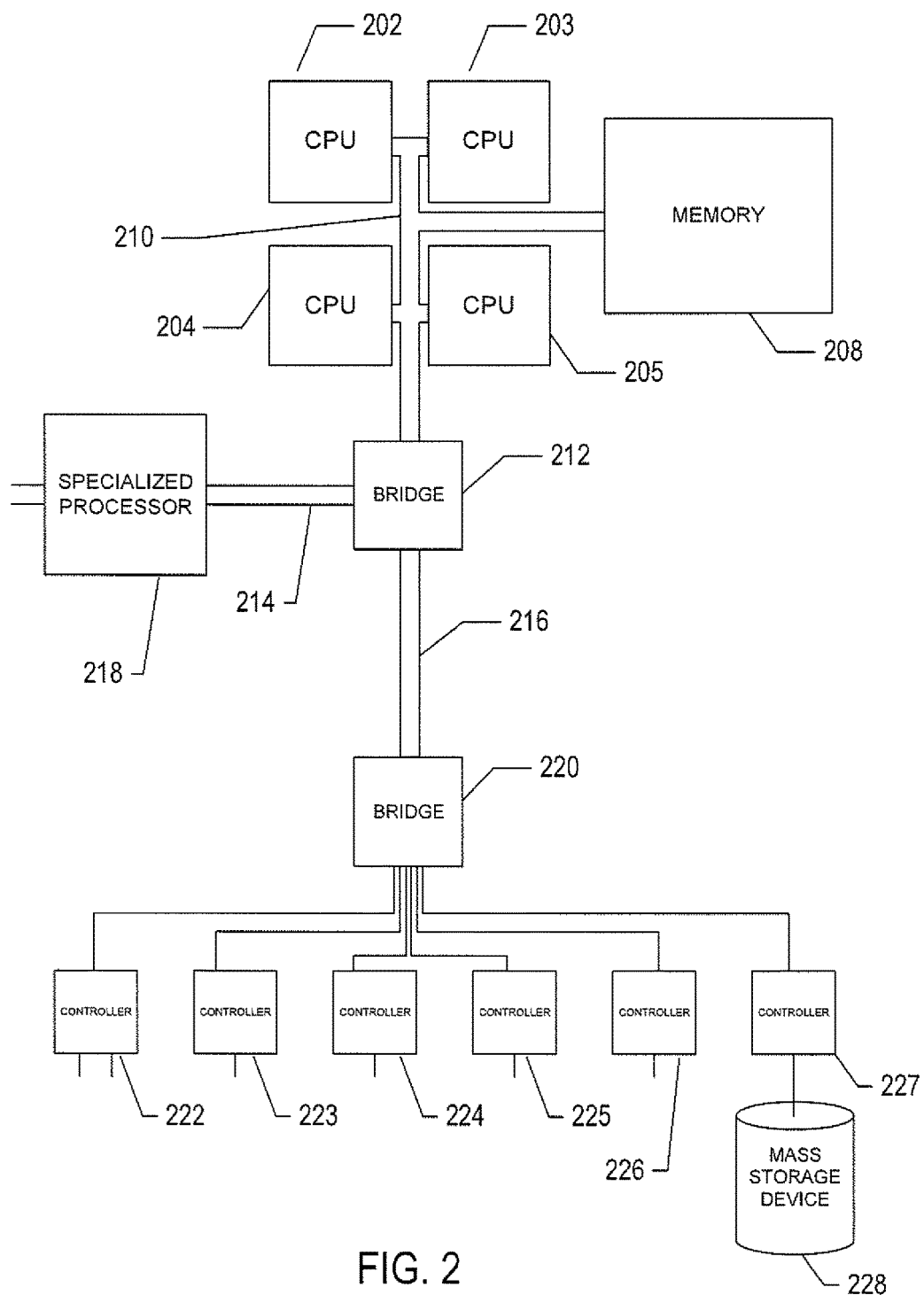
FIG. 2 shows an example of a source code with log write instructions.

There are many different types of architectures of the computer systems 102-106 and 112 that differ from one another in the number of different memories, including different types of hierarchical cache memories, the number of processors and the connectivity of the processors with other system components, the number of internal communications busses and serial links, and in many other ways. FIG. 2 shows a general architectural diagram for various types of computer systems. The computer system contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, and other such components, subcomponents, and computational devices. It should be noted that computer-readable data-storage devices include optical and electromagnetic disks, electronic memories, and other physical data-storage devices.

Figure 3:
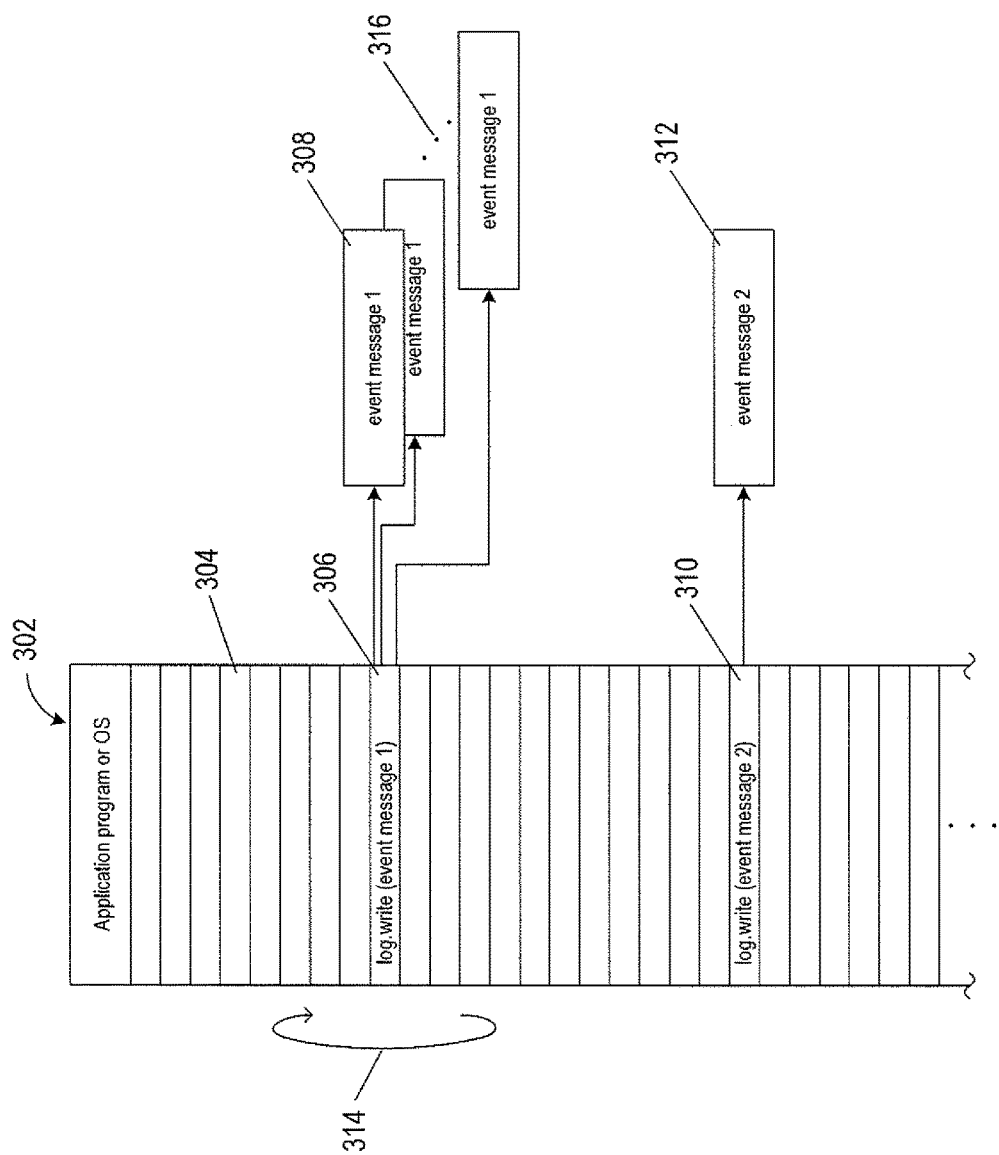
FIG. 3 shows an example of a source code and event messages generated from log write instructions.

FIG. 3 shows an example of a source code 302 of an application program, an operating system, a virtual machine, a container, a guest operating system, or any other computer program or machine code. The source code 302 is just one example of an event source that generates event messages. Rectangles, such as rectangle 304, represent a definition, a comment, a statement, or a computer instruction that expresses some action to be executed by a computer. The source code 302 includes log write instructions that generate event messages when certain events predetermined by the developer occur during execution of the source code 302. For example, source code 302 includes an example log write instruction 306 that when executed generates an "event message 1" represented by rectangle 308, and a second example log write instruction 310 that when executed generates "event message 2" represented by rectangle 312. In the example of FIG. 3, the log write instruction 308 is embedded within a set of computer instructions that are repeatedly executed in a loop 314. As shown in FIG. 3, the same event message 1 is repeatedly generated 316. The same type of log write instructions may also be located in different places throughout the source code, which in turns creates repeats of essentially the same type of event message in the event log.

In FIG. 3, the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event log to which the event message is written. Log write instructions may be written in a source code by the developer of an application program or operating system in order to record events that occur while an operating system or application program is running. For example, a developer may include log write instructions that are executed when certain events occur, such as failures, logins, or errors.

Figure 4:
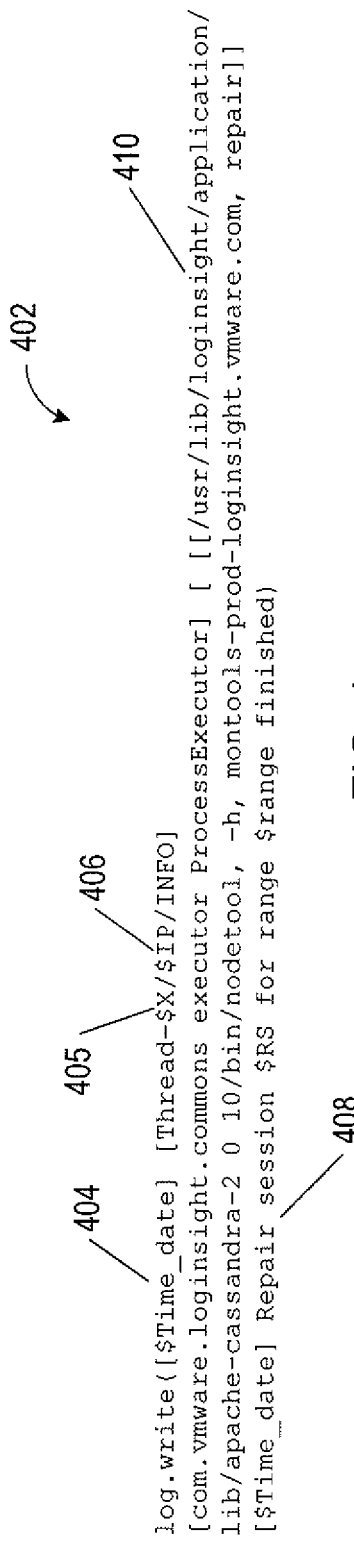
FIG. 4 shows an example of a log write instruction.

FIG. 4 shows an example of a log write instruction 402. In the example of FIG. 4, the log write instruction 402 includes arguments identified with "$." For example, the log write instruction 402 includes a time-stamp argument 404, a thread number argument 405, and an internet protocol ("IP") address argument 406. The example log write instruction 402 also includes text strings and natural-language words and phrases that identify the type of event that triggered the log write instruction, such as "Repair session" 408. The text strings between brackets "[ ]" represent file-system paths, such as path 410. When the log write instruction 402 is executed, parameters are assigned to the arguments and the text strings and natural-language words and phrases are stored as an event message in an event log.

Figure 5:
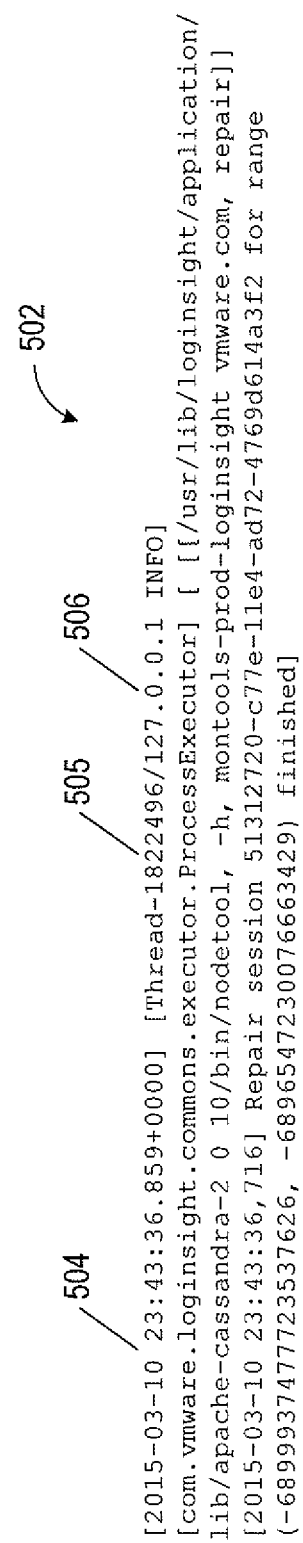
FIG. 5 shows an example of an event message generated by a log write instruction.

FIG. 5 shows an example of an event message 502 generated by the log write instruction 402. The arguments of the log write instruction 402 may be assigned numerical parameters that are recorded in the event message 502 at the time the event message is written to the event log. For example, the time stamp 404, thread 405, and IP address 406 of the log write instruction 402 are assigned corresponding numerical parameters 504-506 in the event message 502. The time stamp 504, in particular, represents the date and time the event message is generated. The text strings and natural-language words and phrases of the log write instruction 402 also appear unchanged in the event message 502 and may be used to identify the type of event that occurred during execution of the application program or operating system.

Figure 6:
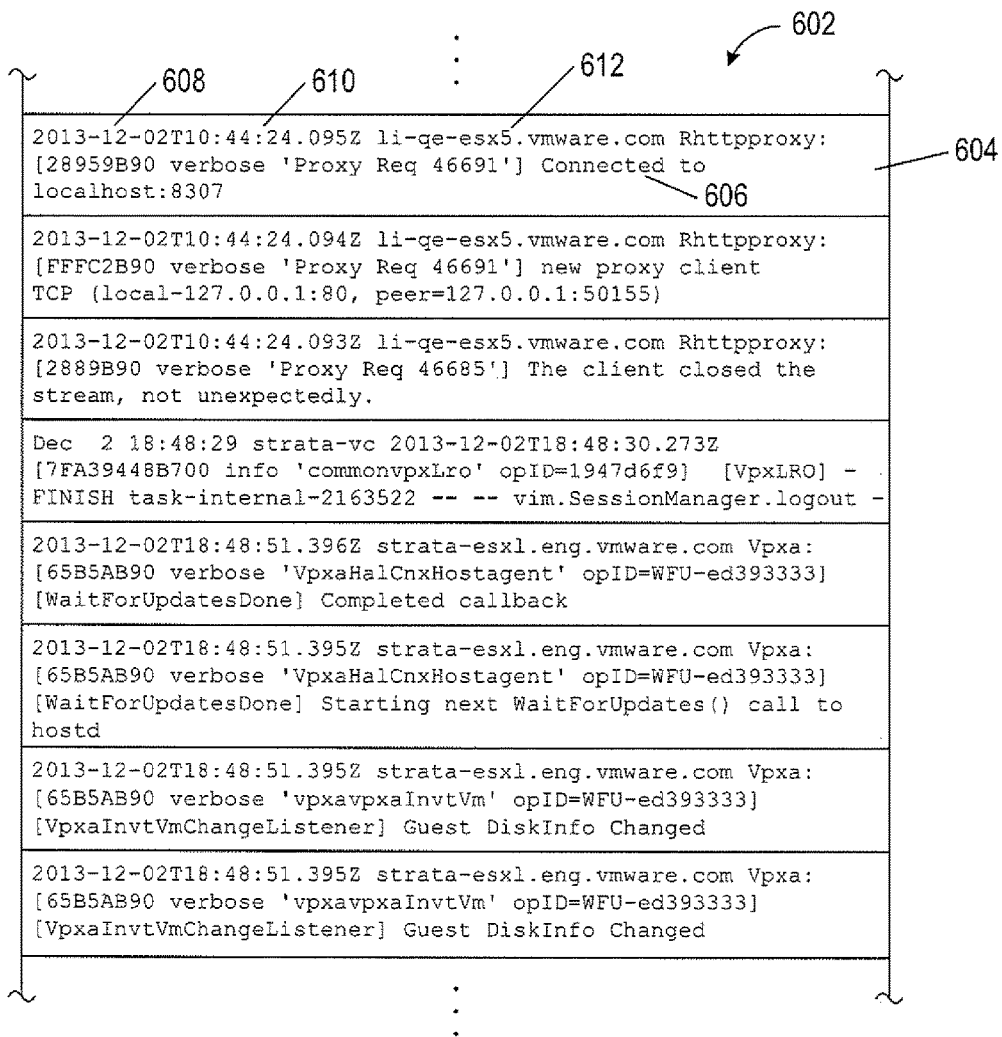
FIG. 6 shows an eight-entry portion of an event log.

As event messages are received from various event sources, the event messages are stored in the order in which the event messages are received. FIG. 6 shows a small, eight-entry portion of an event log 602. In FIG. 6, each rectangular cell, such as rectangular cell 604, of the portion of the event log 602 represents a single stored event message. For example, event message 602 includes a short natural-language phrase 606, date 608 and time 610 numerical parameters, as well as, an alphanumeric parameter 612 that appears to identify a particular host computer.

Figure 7:
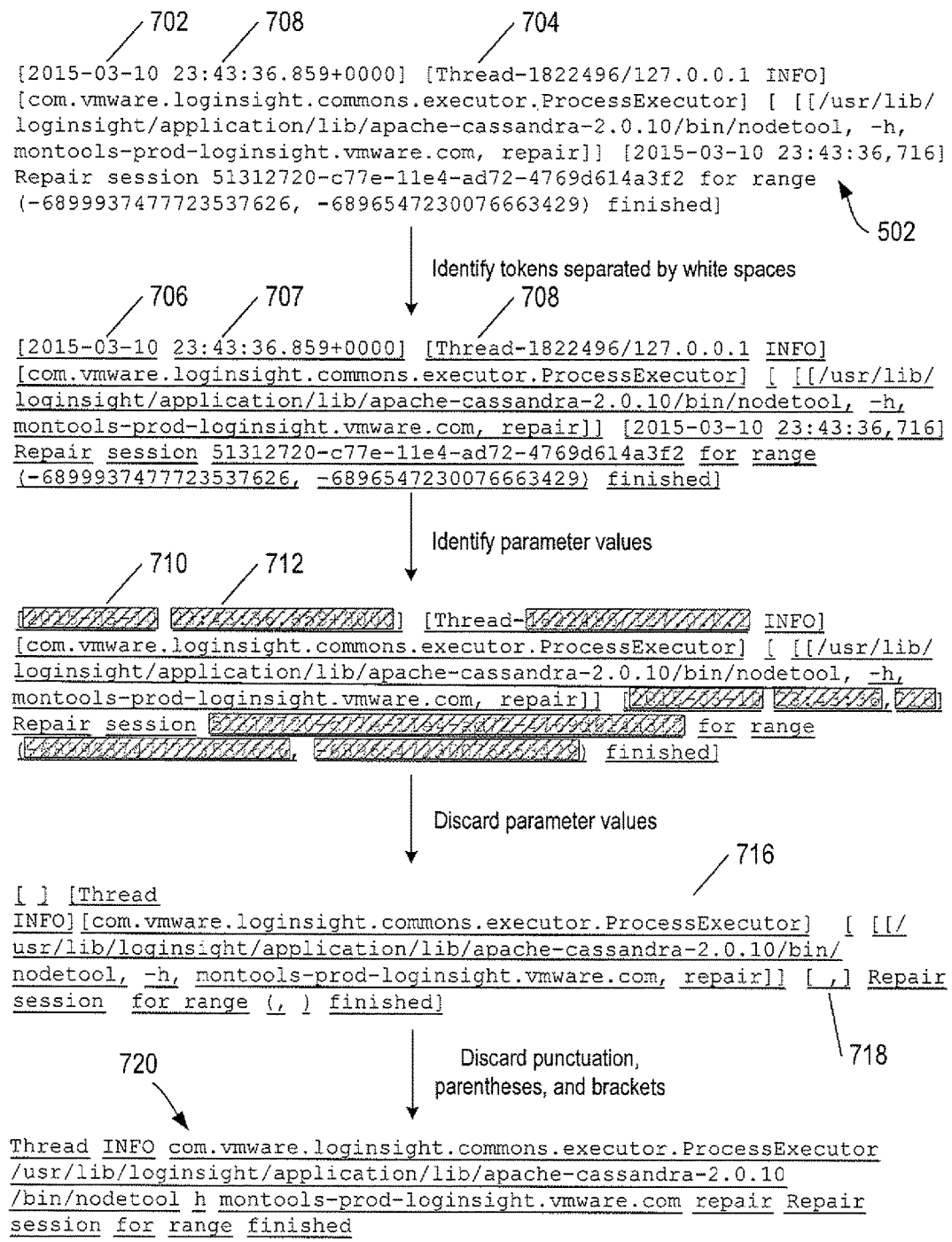
FIG. 7 shows an example of event-type analysis performed on the event message shown in FIG. 5.

FIG. 7 shows an example of event-type analysis performed on the event message 502 shown in FIG. 5. The event message 502 is first tokenized by considering the event message as comprising tokens separated by non-printed characters, referred to as "white space." In FIG. 7, this initial tokenization of the event message 502 is illustrated by underlining of the printed or visible characters. For example, the date 702, time 703, and thread 1804 at the beginning of the text contents of the event message 702, following initial tokenization, become a first token 706, a second token 707, and a third token 708, as indicated by underlining. Next, a token-recognition pass is made to recognize any of the initial tokens as various types of parameters. Parameters are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the phrase "Repair session" in event message 502 likely occurs within each of many repair session event messages. In FIG. 7, the parametric-valued tokens in the event message following initial token recognition are indicated by shading. For example, initial token recognition determines that the first token 706 is a date and the second token 707 is a time. The tokens identified as parameters are identified by shaded rectangles, such as shaded rectangle 710 of the date 706 and shaded rectangle of 712 of the time 707. The parametric-valued tokens are discarded leaving the non-parametric text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of event messages and, in the rare circumstances in which event messages may be mistyped, the mistyping is most often discovered during subsequent processing. In the implementation shown in FIG. 7, the event message 502 is subject to textualization in which an additional token-recognition step of the non-parametric portions of the event message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized event message 714 in FIG. 7. For example, brackets and a coma 718 are underlined. The punctuation, parentheses, and brackets are discarded leaving a textualized event message of interest 720 that comprises only the non-parametric text strings and natural language words and phrases of the original event message 502. The textualized event message 720 represents an event type. Other textualized event messages with the same non-parametric text strings and natural language words and phrase as the textualized event messages 720 are the same event type. Another textualized event message with one or more different non-parametric text strings or natural language words and phrase from those of the textualized event messages 720 is of a different event type.

Figure 8:
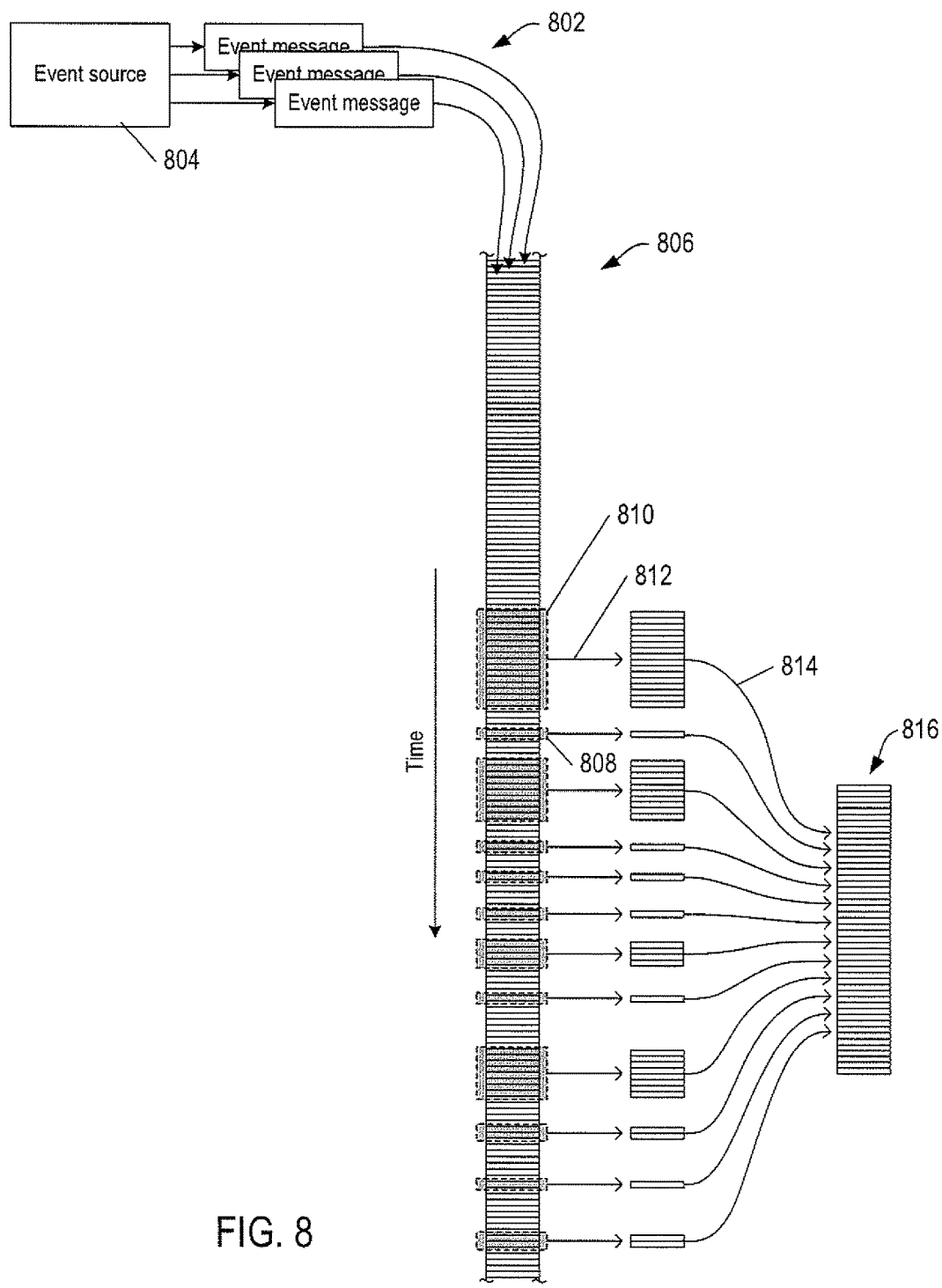
FIG. 8 shows an example of random sampling of event messages generated by an event source.

Methods to Determine Baseline Event-Type Distributions and Detect Abnormal Behavior of Event Sources FIG. 8 shows an example of random sampling of event messages 802 generated by an event source 804. In FIG. 8, the event messages 804 are recorded an event log 806 as described above. In one implementation, individual event messages and series of event messages recorded in the event log 806 are randomly sampled. Random sampling includes randomly selecting an event message or series of event messages, copying the selected event messages, and recording the copied event messages in a subset of event messages of a data-storage device. Shaded boxes identify randomly selected event messages, such as shaded box 808, and randomly sampled series of event messages, such as shaded box 810. The randomly selected event messages are copied and recorded as a block of event messages of the much large set of event messages recorded in the event log 806. Directional arrows, such as directional arrow 812, represent copying the randomly selected event messages from the event log 806. Directional arrows, such as directional arrow 814, represent collecting the randomly selected event messages to form a subset of event messages 816.

In the example of FIG. 8, the random sampling is performed on event messages that have already been recorded in the event log 806. In an alternative implementation, random sampling is applied to event messages as the event messages are generated by the event source 804. For example, a randomly selected event message generated by an event source is selected, copied, and recorded in as a block of event messages stored in a data-storage device while the original event message is sent and recorded in the event log 806.

Figure 9:
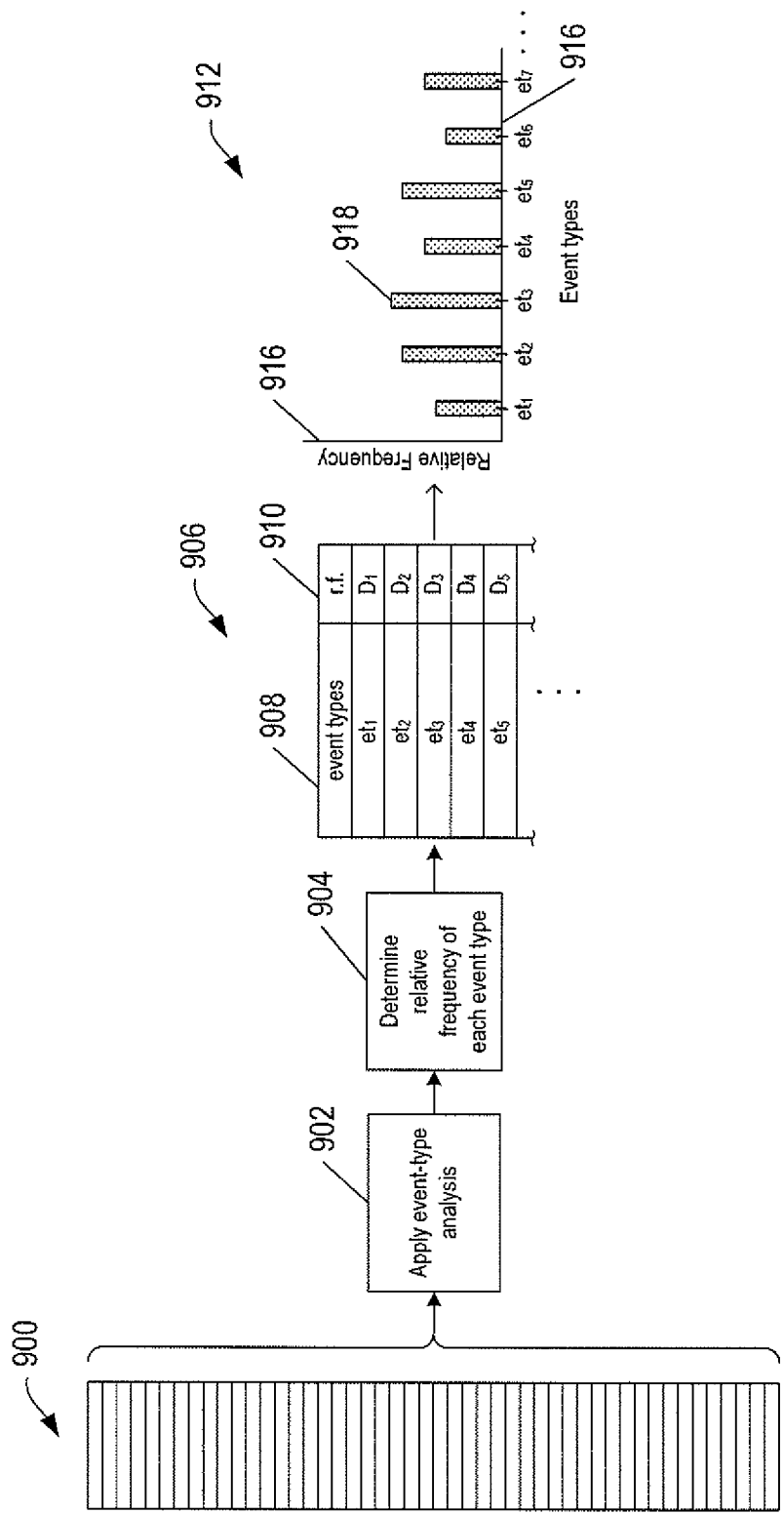
FIG. 9 shows a method of determining an event-type distribution from event messages.

A number N of blocks of event messages are collected for the event source. Event type analysis is applied to each block of event messages to compute a corresponding event-type distribution that comprises relative frequencies of different event types recorded in the block of event messages. FIG. 9 shows a method of determining an event-type distribution from event messages recorded in a block of event messages 900. In block 902, event-type analysis is applied to each event message of the block of event messages to determine the event type of each event message. Event-type analysis reduces the event message to text strings and natural-language words and phrases (i.e., non-parametric tokens), as described above with reference to FIG. 7. The different event types are denoted by $et_i$, where i is an event type index. In block 904, a relative frequency is computed for each event type according to $$D_i^n = \frac{n(et_i)}{L_n} \quad (1)$$

where $n(et_i)$ is the number of times an event type, $et_i$, appears in the block of event messages;

subscript and superscript n is an integer event-type distribution index n=1, 2, . . . , N; and $L_n$ is the total number of event messages in the block of event messages.

An event-type log 906 is formed from the different event types and associated relative frequencies. The event-type log 906 comprises a list of the different event types 908 and corresponding relative frequencies 910 of each event type and serves as a record of the event-type distribution. FIG. 9 also shows a histogram 912 of the event-type distribution recorded in the event-type log 906. Horizontal axis 914 represents the different event types. Vertical axis 916 represents a range of relative frequencies. Shaded bars represent the relative frequency of each event type. For example, shaded bar 918 represents the relative frequency $D_3^n$ of the event type $et_3$. An event-type distribution for M event types in a block of event messages is denoted by $$ET_n=(D_1^n,D_2^n,D_3^n, \ldots ,D_M^n) \quad (2)$$

Each event-type distribution is an M-tuple that corresponds to a data point in an M-dimensional space.

According to the maximum entropy principle, the event-type distribution that best represents the state of the event source and therefore can serve as a baseline event-type distribution is the event-type distribution with the largest associated entropy. For each of the N event-type distributions obtained from N blocks of randomly sampled event messages generated by the event source as described, an associated entropy is computed as follows:

$$H(ET_n) = -\sum_{m=1}^{M} D_m^n \log_2 D_m^n \quad (3)$$

The maximum entropy is given by $$H_{max}=\max(H(ET_1),H(ET_2), \ldots ,H(ET_N)) \quad (4)$$

The event-type distribution with the maximum corresponding entropy, $H_{max}$, is as a baseline even-type distribution for the event source and is denoted by $$ET_b=(D_1^b,D_2^b,D_3^b, \ldots ,D_M^b) \quad (5)$$

Once the baseline event-type distribution is determined, a normal discrepancy radius centered at the baseline event-type distribution is determined based on the similarities between pairs of event-type distributions. In certain implementations, the similarity between a pair of event-type distributions $ET_i$ and $ET_j$ may be computed using a cosine similarity given by:

$$Sim_{CS}(ET_i, ET_j) = 1 - \frac{2}{\pi}\cos^{-1}\left[\frac{\sum_{m=1}^{M} D_m^i D_m^j}{\sqrt{\sum_{m=1}^{M} (D_m^i)^2}\sqrt{\sum_{m=1}^{M} (D_m^j)^2}}\right] \quad (6)$$

The closer the similarity $Sim_{CS}(ET_i, ET_j)$ is to zero, the farther the event-type distributions $ET_i$ and $ET_j$ are from each other. The closer the similarity $Sim_{CS}(ET_i, ET_j)$ is to one, the closer the event-type distributions $ET_i$ and $ET_j$ are to each other. In another implementation, the similarity between pair of event-type distributions $ET_i$ and $ET_j$ may be computed as follows:

$$Sim_{JS}(ET_i, ET_j) = \quad (7)$$
$$1 - \sum_{m=1}^{M} M_m \log_2 M_m + \frac{1}{2}\left[\sum_{m=1}^{M} D_m^i \log_2 D_m^i + \sum_{m=1}^{M} D_m^j \log_2 D_m^j\right]$$

where $M_m = (D_m^i + D_m^j)/2$.

where $M_m=(D_m^i+D_m^j)/2$.

The similarity in Equation (7) is based on the Jensen-Shannon divergence and, like the cosine similarity, and is used to measure the similarity between two distributions $ET_i$ and $ET_j$. The closer $Sim_{JS}(ET_i, ET_j)$ is to one, the more similar the distributions $ET_i$ and $ET_j$ are to one another. The closer $Sim_{JS}(ET_i, ET_j)$ is to zero, the more dissimilar the distributions $ET_i$ and $ET_j$ are to one another. In the following discussion, the similarity $Sim(ET_i, ET_j)$ represents the similarity $Sim_{CS}(ET_i, ET_j)$ or the similarity $Sim_{JS}(ET_i, ET_j)$.

Figures 10A, 10B:
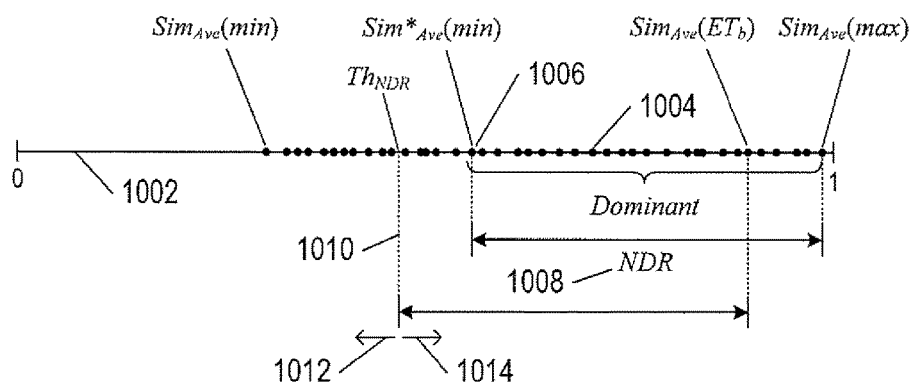
FIG. 10A shows a table of similarities computed for pairs of event-type distributions.
FIG. 10B shows an example plot of similarities.

FIG. 10A shows a table of similarities computed between each pair of event-type distributions $ET_i$ and $ET_j$ for i=1, 2, . . . , N and j=1, 2, . . . , N with j≠i. The average similarity of each event-type distribution is given by:

$$Sim_{Ave}(ET_i) = \frac{1}{N-1} \sum_{\substack{j=1 \\ j \neq i}}^{N-1} Sim(ET_i, ET_j) \qquad (8)$$

The average similarities form a set of average similarities represented by:

$(Sim_{Ave}(ET_1), Sim_{Ave}(ET_2), \ldots, Sim_{Ave}(ET_N))$

The average similarities are rank ordered from smallest to largest. FIG. 10B shows an example set of average similarities plotted along a number line 1002 between zero and one. Solid dots, such as solid dot 1004, represent the values of averages similarities. The largest average similarity is denoted by $Sim_{Ave}(\text{max})$ and the smallest average similarity is denoted by $Sim_{Ave}(\text{min})$. A select number L of the largest average similarities are identified as the dominant average similarities with a minimum average similarity in the dominant average similarities denoted by $Sim_{Ave}^*(\text{min})$, where $Sim_{Ave}^*(\text{min}) > Sim_{Ave}(\text{min})$. Dot 1006 represents the minimum average similarity of the set of dominant similarities denoted by $Sim_{Ave}^*(\text{min})$. Average similarities less than $Sim_{Ave}^*(\text{min})$ are ignored or discarded. A normal discrepancy radius 1008 is calculated as the difference between the maximum and minimum average similarities of the dominant average similarities as follows:

$$NDR = Sim_{Ave}(\text{max}) - Sim_{Ave}^*(\text{min}) \qquad (9)$$

The normal discrepancy radius is used to calculate a normal discrepancy radius threshold given by:

$$Th_{NDR} = Sim_{Ave}(ET_b) - NDR \qquad (10)$$

where $Sim_{Ave}(ET_b)$ is the average similarity of the baseline event-type distribution.

In FIG. 10B, dashed line 1012 represents the normal discrepancy radius threshold.

Figure 11:
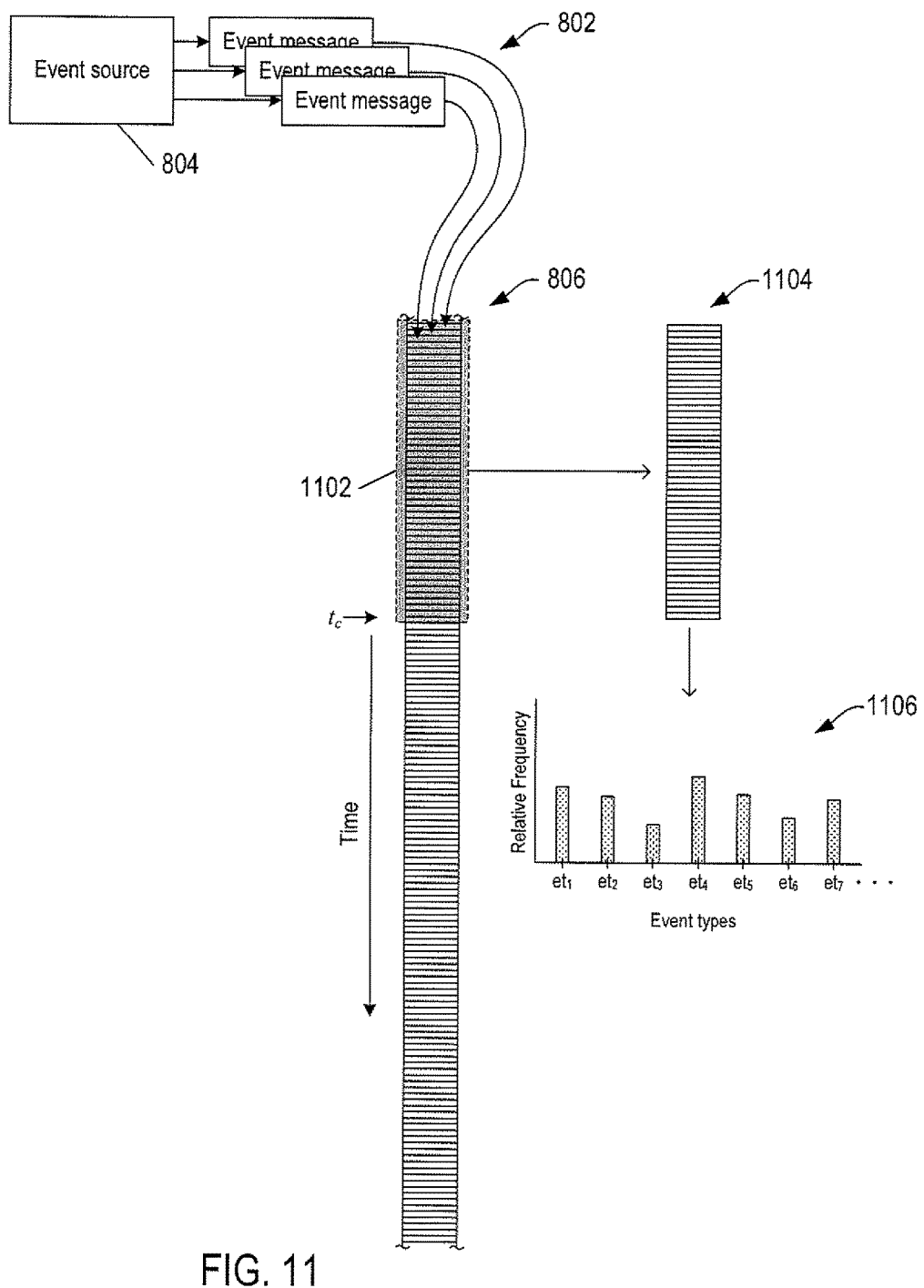
FIG. 11 shows an example of determining an event-type distribution from run-time event messages.

FIG. 11 shows run-time event messages 1102 recorded in an event log 806. Behavior of the event source 804 is monitored with sets of consecutive run-time event messages. The time $t_c$ represents a randomly or periodically selected point in time when identification of run-time event messages begins. Shaded box 1102 identifies run-time event messages that comprise a fixed number Q of the most recent, consecutively generated event messages after the time $t_c$. Event-type analysis is applied to the run-time event messages 1104 copied from the event log 806, as described above with reference to FIG. 9, to obtain a corresponding run-time event-type distribution 1106 represented by $$ET_{rt} = (D_1^{rt}, D_2^{rt}, D_3^{rt}, \ldots, D_M^{rt}) \qquad (11)$$

An average similarity of the run-time event-type distribution and the event-type distributions is computed as follows:

$$Sim_{Ave}(ET_{rt}) = \frac{1}{N} \sum_{j=1}^{N} Sim(ET_{rt}, ET_j) \qquad (12)$$

When the average similarity of the run-time event-type distributions satisfies the condition:

$$Sim_{Ave}(ET_{rt}) \geq Th_{NDR} \qquad (13a)$$

the event source is assumed to be in a normal state and no alert is generated. On the other hand, when the average similarity of the run-time event-type distributions satisfies the condition:

$$Th_{NDR} > Sim_{Ave}(ET_{rt}) \qquad (13b)$$

an alert is generated indicating that the event source has entered an abnormal state.

Additional severity-level thresholds $Th_1$ and $Th_2$ that distinguish severity levels of abnormal behavior of the event source can be used to generate alerts that identify the severity of the alert as follows:

$$Th_2 < Th_1 < Th_{NDR} \qquad (13c)$$

When $Th_1 < Sim_{Ave}(ET_{rt}) < Th_{NDR}$ the alert may be identified as a warning. When $Th_2 < Sim_{Ave}(ET_{rt}) < Th_1$, the alert may be identified as an error. When $Sim_{Ave}(ET_{rt}) < Th_2$, the alert may be identified as critical and the event source may be shut down or taken off line.

Returning to FIG. 10B, when the average similarity of the run-time distributions is less than the threshold 1010, as represented by directional arrow 1012, an alert is generated indicating that the event source has entered an abnormal state. When the average similarity of the run-time distributions is greater than the threshold 1010, as represented by directional arrow 1014, the event source is assumed to be in normal state and no alert is generated.

The number N of event-type distributions and select number of L event-type distributions that are candidate baseline event-type distributions may be determined based on a percentage of the time the event source maintains a normal state. The percentage of the time the event source maintains a normal operational state is P×100%, where P is the probability the event source is in a normal state when an event message is collected. Each randomly sampled event message is independent and does change the probability of randomly selecting another event message. For example, when normal state probability is P=0.99, then there is a 99% chance that a randomly sampled event message or portion of event messages, as described above with reference to FIG. 8, is collected during a normal state of the event source. On the other hand, there is a 1% chance that a randomly sampled event message or portion of event messages is collected during an abnormal state of the event source.

The binomial distribution gives the probability of generating L candidate baseline event-type distributions from randomly sampled event messages generated by the event source in a normal state out a total of N event-type distributions generated from randomly sampled event messages:

$$Prob(L \text{ successes in } N \text{ trials}) = \binom{N}{L} P^L (1-P)^{N-L} \qquad (14a)$$

where $$\binom{N}{L} = \frac{N!}{L!(N-L)!}$$

The probability of L or more candidate baseline event-type distributions generated from randomly sampled event messages generated by the event source in a normal state is computed from the cumulative binomial distribution:

$$P_{cum}(X \geq L) = \sum_{i=L}^{N} \binom{N}{i} P^i (1-P)^{N-i} \quad (14b)$$

where $L \leq N$.

where $L \leq N$.

The cumulative binomial distribution of Equation (14b) is a confidence level that L of the N event-type distributions and candidate event-type distributions will be obtained when the event source is in a normal state.

Three examples of normal state probabilities and associated total number N of event-type distributions and confidence levels that L of the N event-type distributions are candidate event-type distributions that are representative of the event source in a normal state are provided in the table:

| P | NET distributions | LET distributions | $P_{cum}$ |
|---|---|---|---|
| 0.99 | 5 | 4 | 0.9990 |
| 0.95 | 7 | 4 | 0.9998 |
| 0.90 | 8 | 4 | 0.9996 |

The above table indicates that when the normal state probability is 0.99, five (i.e., N=5) event-type distributions are generated from randomly selected event messages, as described above with reference FIGS. 8 and 9. The confidence level of 0.9990 indicates that four (i.e., L=4) of the five are candidate baseline event-type distributions with the largest average similarities can be used to generate a normal discrepancy radius as described above with reference to FIG. 10B and Equation (8), and the candidate baseline event-type distribution with the largest entropy computed as described above with reference to Equations (3) and (4) is the baseline event-type distributions. When the normal state probability is 0.95, seven (i.e., N=7) event-type distributions are generated from randomly selected event messages, as described above with reference FIGS. 8 and 9. The confidence level of 0.9998 indicates that four (i.e., L=4) of the seven are candidate baseline event-type distributions with the four largest average similarities can be used to generate a normal discrepancy radius as described above with reference to FIG. 10B and Equation (8), and the candidate baseline event-type distribution with the largest entropy computed as described above with reference to Equations (3) and (4) is the baseline event-type distributions. When the normal state probability is 0.90, eight (i.e., N=8) event-type distributions are generated from randomly selected event messages, as described above with reference FIGS. 8 and 9. The confidence level of 0.9996 indicates that four (i.e., L=4) of the eight are candidate baseline event-type distributions with the four largest average similarities can be used to generate a normal discrepancy radius as described above with reference to FIG. 10B and Equation (8), and the candidate baseline event-type distribution with the largest entropy computed as described above with reference to Equations (3) and (4) is the baseline event-type distributions.

In an alternative implementation, rather that forming a block of event messages from random sampling of event messages as described above, blocks of event messages can be generated by copying consecutively recorded event messages generated by event source. Event-type analysis is applied to each block of event messages as described above with reference to FIG. 9 to obtain an associated event-type distribution.

Figure 12:
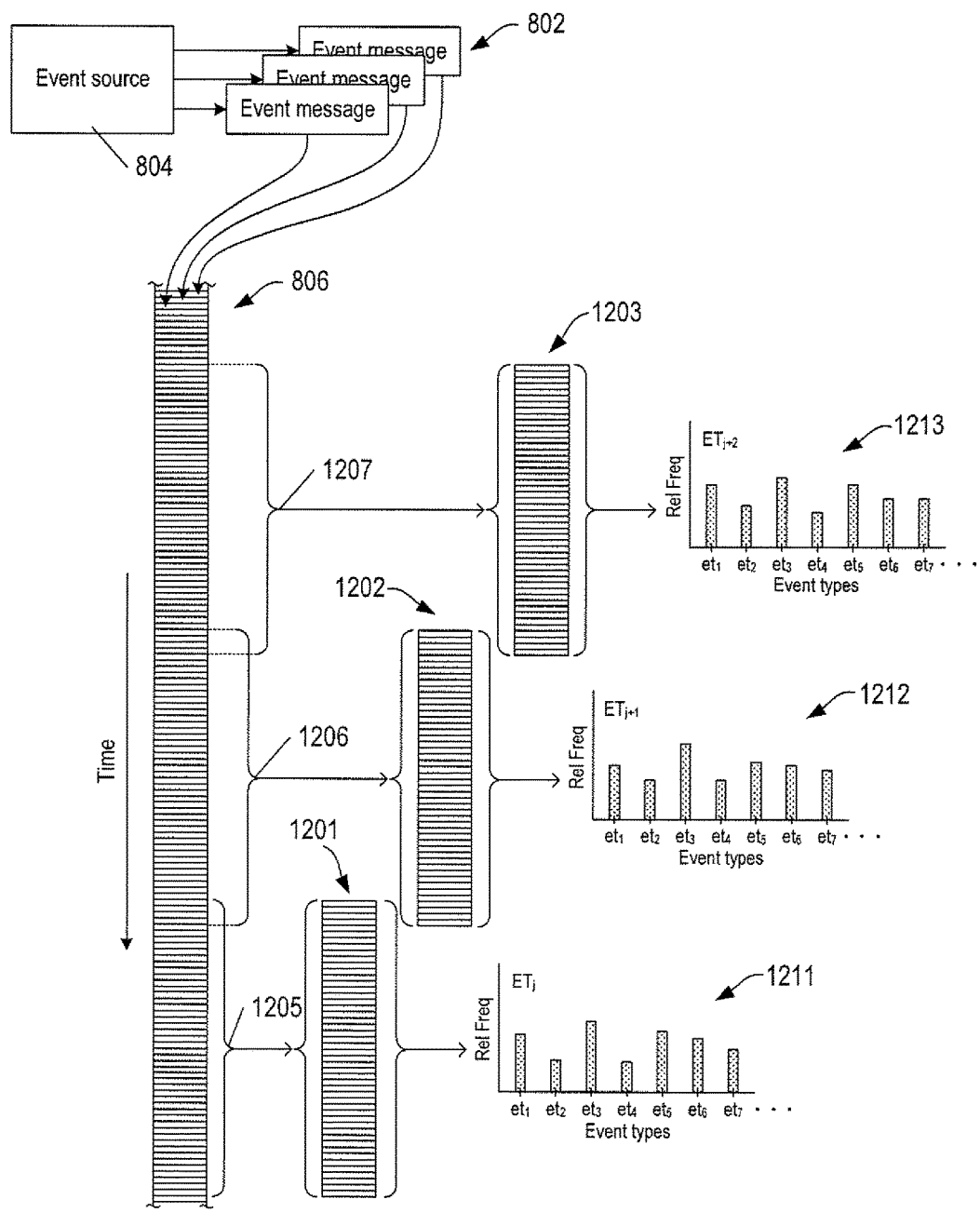
FIG. 12 shows examples of event-type distributions computed from continuous blocks of event messages.

FIG. 12 shows examples of blocks of event messages 1201-1203 obtained from copying corresponding consecutively recorded event messages 1205-1207, respectively. In the example of FIG. 12, the blocks of event messages 1205-1207 overlap by four event messages. In other implementations, blocks of event messages can be obtained from non-overlapping consecutively recorded event messages. Event-type analysis as described above with reference to FIG. 9 is applied to event messages in each block of event messages in order to obtain a corresponding event-type distribution. For example, event-type distributions 1211-1213 are obtained from corresponding blocks of event messages 1201-1203.

Figure 13A:
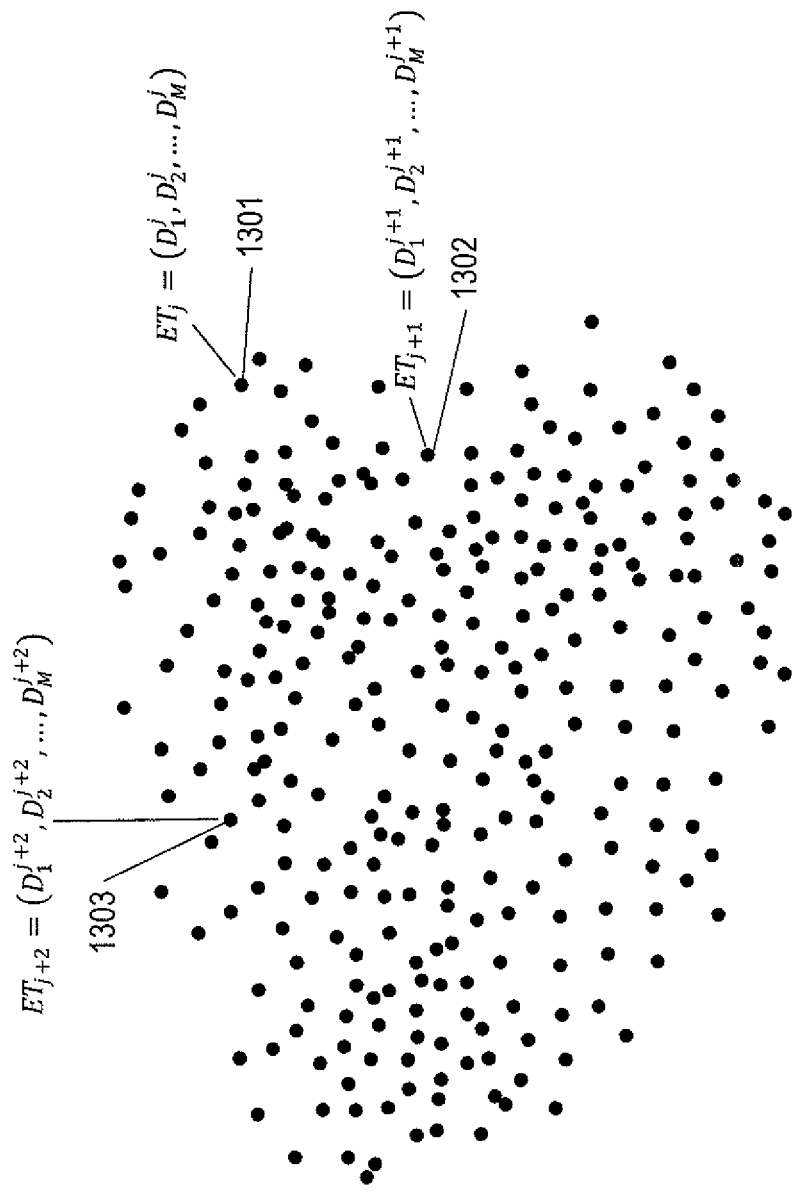
FIG. 13A shows an example plot of event-type distributions as M-tuples in an M-dimensional space.

Event-type distributions are M-tuples in an M-dimensional space. FIG. 13A shows a random scattering of M-tuples in an example M-dimensional space. Each M-tuple represents an event-type distribution obtained from a block of event messages, as described above with reference to FIG. 12. For example, dots 1301-1303 are M-tuples that represent event-type distributions $ET_j$, $ET_{j+1}$, and $ET_{j+2}$.

A local outlier factor ("LOF") is computed for each event-type distribution in the M-dimensional space represented by a set of event-type distributions:

$$C = \{ET_1, ET_2, \ldots, ET_N\} \quad (15)$$

Computation of a local outlier factor begins by computing a distance between each pair of event-type distributions in the M-dimensional space. In certain implementations, the distance between each pair of event-type distributions is computed using a cosine distance given by:

$$Dist_{CS}(ET_i, ET_j) = \frac{2}{\pi} \cos^{-1}\left[\frac{\sum_{m=1}^{M} D_m^i D_m^j}{\sqrt{\sum_{m=1}^{M}(D_m^i)^2}\sqrt{\sum_{m=1}^{M}(D_m^j)^2}}\right] \quad (16)$$

The closer the distance $Dist_{CS}(ET_i, ET_j)$ is to zero, the closer the event-type distributions $ET_i$ and $ET_j$ are to each other. The closer the distance $Dist_{CS}(ET_i, ET_j)$ is to one, the farther distributions $ET_i$ and $ET_j$ are from each other. In another implementation, the distance between event-type distributions may be computed using Jensen-Shannon divergence:

$$Dist_{JS}(ET_i, ET_j) = \quad (17)$$
$$-\sum_{m=1}^{M} M_m \log_2 M_m + \frac{1}{2}\left[\sum_{i=1}^{M} D_m^i \log_2 D_m^i + \sum_{i=1}^{m} D_m^j \log_2 D_m^j\right]$$

where $M_m = (D_m^i + D_m^j)/2$.

where $M_m = (D_m^i + D_m^j)/2$.

The Jensen-Shannon divergence ranges between zero and one and has the properties that the distributions $ET_i$ and $ET_j$ are similar the closer $Dist_{JS}(ET_i, ET_j)$ is to zero and are dissimilar the closer $Dist_{JS}(ET_i, ET_j)$ is to one. In the following discussion, the distance $Dist(ET_i, ET_j)$ represents the distance $Dist_{CS}(ET_i, ET_j)$ or the distance $Dist_{JS}(ET_i, ET_j)$.

For each event-type distribution $ET_i$, $i=1, \ldots N$, the distances $dist(ET_i, ET_j)$ are rank ordered for $j=1, \ldots, N$ and $j \neq i$. The K-th nearest neighbor distance of the rank ordered distances for the even-type distribution $ET_i$ is determined and denoted by $dist_K(ET_i)$, where K is a selected natural number. The K-th nearest neighbor distance $dist_K(ET_i)$ is called the K-distance. Given the K-distance, a K-distance neighborhood of event-type distributions with a distance to the event-type distribution $ET_i$ that is less than or equal to the K-distance is given by:

$$N_K(ET_i) = \{ET_j \in C \setminus \{ET_i\} \mid dist(ET_i, ET_j) \leq dist_K(ET_i)\} \quad (18)$$

A local reachability density is compute for the event-type distribution $ET_i$ as follows:

$$lrd(ET_i) = \frac{\|N_K(ET_i)\|}{\sum_{ET_j \in N_K(ET_i)} \text{reach} - dist_K(ET_i, ET_j)} \quad (19)$$

where $\|N_K(ET_i)\|$ is the number of event-type distributions in the K-distance neighborhood $N_K(ET_i)$; and reach–$dist_K(ET_i, ET_j)$ is the reachability distance of the event-type distribution $ET_i$ to the event-type distribution $ET_j$.

The reachability distance is given by:

$$\text{reach} - dist_K(ET_i, ET_j) = \max\{dist_K(ET_i), dist(ET_i, ET_j)\} \quad (20)$$

where $j = 1, \ldots, N$ and $j \neq i$.

An LOF is computed for the event-type distribution $ET_i$ as follows:

$$LOF(ET_i) = \frac{\sum_{ET_j \in N_K(ET_i)} \frac{lrd(ET_j)}{lrd(ET_i)}}{\|N_K(ET_i)\|} \quad (21)$$

Figure 13B:
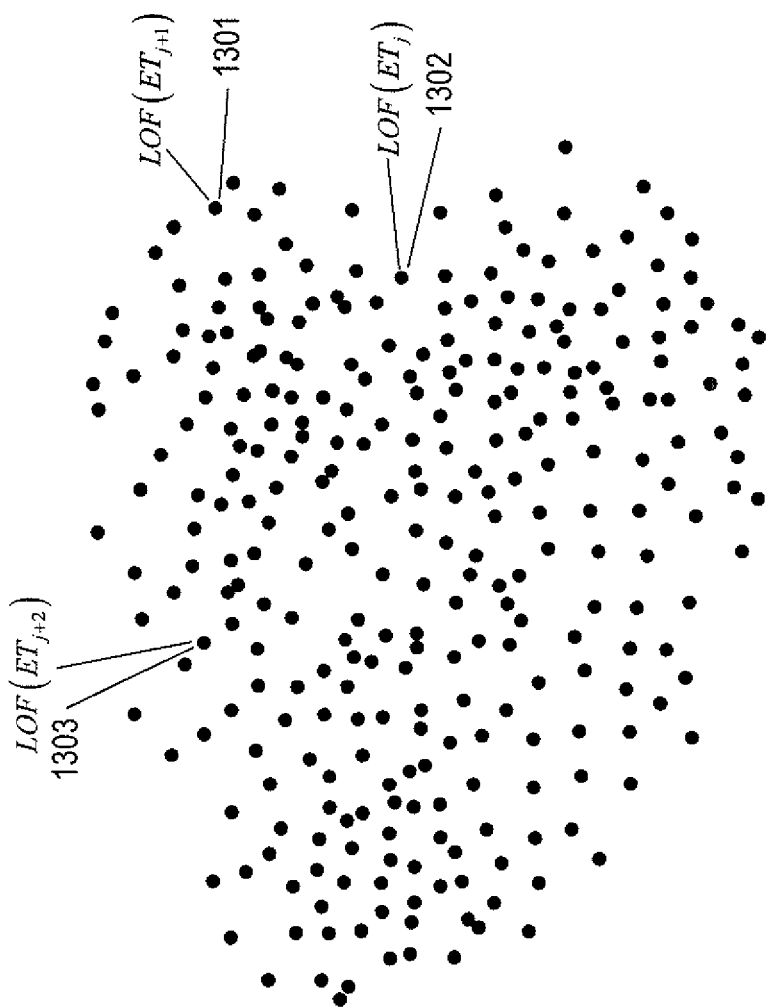
FIG. 13B shows local outlier factors computed for event-type distributions in FIG. 13A.

The LOF of Equation (21) is an average local reachability density of the neighboring coordinate data points divided by the local reachability density. An LOF is computed for each event-type distribution in C. FIG. 13B shows LOF's computed for each event-type distribution in the M-dimensional space of FIG. 13A.

The LOF's determined for the event-type distributions are rank ordered and an event-type distribution, $ET_c$, with the smallest corresponding LOF is the baseline event-type distribution $LOF(ET_b) \leq LOF(ET_j)$ for $j = 1, \ldots, N$ and $b \neq j$. Ideally, the smallest LOF is unique and the corresponding event-type distribution is the baseline event-type distribution. In the case where there are two or more equal value LOF minima, the corresponding two or more event-type distributions are candidate baseline event-type distributions. Entropies of the two or more candidate baseline event-type distributions are computed. The candidate baseline event-type distribution with the largest corresponding entropy is identified at the only baseline event-type distribution. For example, suppose there are two candidate baseline event-type distributions $ET_{b_1}$ and $ET_{b_2}$ with minimum $LOF(ET_{b_1}) = LOF(ET_{b_2})$. The corresponding entropies of the two candidate baseline event-type distributions are computed as follows:

$$H(ET_{b_1}) = -\sum_{m=1}^{M} D_m^{b_1} \log_2 D_m^{b_1} \quad (22a)$$

$$H(ET_{b_2}) = -\sum_{m=1}^{M} D_m^{b_2} \log_2 D_m^{b_2} \quad (22b)$$

If $H(ET_{b_1}) > H(ET_{b_2})$, then the candidate baseline event-type distribution $ET_{b_1}$ is the baseline event-type distribution. If $H(ET_{b_2}) > H(ET_{b_1})$, then the candidate baseline event-type distribution $ET_{b_2}$ is the baseline event-type distribution.

In another implementation, an event-type distribution having a minimum average distance to the other event-type distributions in the M-dimensional space is identified as the baseline event-type distribution. FIG. 14 shows a matrix of distances computed between each event-type distribution to each of the other event-type distributions. The average distance of each event-type distribution from the other event-type distributions is located below each column and is computed as follows:

$$Dist^A(ET_i) = \frac{1}{N-1} \sum_{j=1, j \neq i}^{N} Dist(ET_i, ET_j) \quad (23)$$

For example, column 1402 is a list of distances computed between the even-type distribution $ET_1$ and each of the event-type distributions $ET_2, ET_3, \ldots,$ and $ET_N$. The average distance from the even-type distribution $ET_1$ to the other event-type distributions $ET_2, ET_3, \ldots,$ and $ET_N$ is denoted by $Dist^A(ET_1)$. The event-type distribution with the minimum average distance is identified as the baseline event-type distribution $ET_b$ for the event-type distributions in the M-dimensional space.

A mean distance from the baseline event-type distribution to other event-type distributions is computed as follows:

$$\mu(ET_b) = \frac{1}{N-1} \sum_{j=1, j \neq b}^{N} Dist(ET_b, ET_j) \quad (24a)$$

A standard deviation of distance from the baseline event-type distribution to other event-type distributions is computed as follows:

$$std(ET_b) = \sqrt{\frac{1}{N-1} \sum_{j=1, j \neq b}^{N} (Dist(ET_b, ET_j) - \mu(ET_b))^2} \quad (24b)$$

When the event-type distributions are normally distributed about the mean given by Equation (24a), the normal discrepancy radius is given by:

$$NDR_\pm = \mu(ET_b) \pm B \cdot std(ET_b) \quad (25)$$

where B is an integer number of standard deviations (e.g., B=3) from the mean in Equation (24a).

The normal discrepancy radius is centered at the mean distance from the baseline event-type distribution to other event-type distributions given by Equation (25). When the average distance of a run-time event-type distribution $ET_{rt}$ to the event-type distributions is obtained as described above with reference to FIG. 11 satisfies the following condition:

$$NDR_- \leq Dist^A(ET_{rt}) \leq NDR_+ \quad (26a)$$

where the average distance of the run-time event-type distribution $ET_{rt}$ to the event-type distributions is given by:

$$Dist^A(ET_{rt}) = \frac{1}{N} \sum_{j=1}^{N} Dist(ET_{rt}, ET_j) \quad (26b)$$

The event source is in a normal state. On the other hand, when the average distance satisfies either of the following conditions:

$$Dist^A(ET_{rt}) \geq NDR_- \text{ or } NDR_+ \leq Dist^A(ET_{rt}) \quad (26c)$$

the event source is in an abnormal state.

Additional thresholds may be used to identify a severity level for the abnormal state of the event source. In one implementation, additional severity-level thresholds that distinguish severity levels of abnormal behavior of the event source can be used to generate alerts that identify the severity of the problem as follows:

$$NDR_+ < Th_1^+ < Th_2^+ \quad (26d)$$

When $NDR_+ < Dist^A(ET_{rt}) < Th_1^+$ the alert may be identified as a warning. When $Th_1^+ < Dist^A(ET_{rt}) < Th_2^+$, the alert may be identified as an error. When $Th_2^+ < Dist^A(ET_{rt})$, the alert may be identified as critical and the event source may be shut down or taken off line. Analogous severity-level thresholds may be defined and used with $NDR_-$ as follows:

$$NDR_- > Th_1^- > Th_2^- \quad (26e)$$

When $NDR_- > Dist^A(ET_{rt}) > Th_1^-$ the alert may be identified as a warning. When $Th_1^- > Dist^A(ET_{rt}) > Th_2^-$, the alert may be identified as an error. When $Th_2^- > Dist^A(ET_{rt})$, the alert may be identified as critical and the event source may be shut down or taken off line.

In an alternative implementation, when the event-type distribution about the mean is unknown, the Chebyshev's inequality may be used to compute a normal discrepancy radius given by:

$$NDR_\pm = \mu(ET_b) \pm k^* std(ET_b) \quad (27a)$$

where $k > 1$.
The Chebyshev inequality states that $$P(|Dist^A(ET_{rt}) - \mu(ET_b)| \geq k \cdot std(ET_b)) \leq \frac{1}{k^2} \quad (27b)$$

An event source may operate in two or more normal states or modes. For example, an event source may have high, medium, and low usage states. As a result, the event-type distributions in the M-dimensional space may also clustered according to the different normal states. Clustering techniques may be used to determine the different clusters of event-type distributions. K-means clustering is applied to the full set of event-type distributions with an initial set of cluster centroids denoted by $\{q_j\}_{j=1}^k$. The locations of the k cluster centers are recalculated with each iteration to obtain k clusters. Each event-type distribution $ET_n$ assigned to one of the k clusters defined by:

$$C_i^{(m)} = \{ET_n : ET_n - q_i^{(m)}| \leq |ET_n - q_j^{(m)}| \forall j, 1 \leq j \leq k\} \quad (28)$$

where
$C_i(m)$ is the i-th cluster i=1, 2, ..., k; and
m is an iteration index m=1, 2, 3, ....
The cluster centroid $q_i^{(m)}$ is the mean value of the event-type distribution in the i-th cluster, which is computed as follows:

$$q_i^{(m+1)} = \frac{1}{|C_i^{(m)}|} \sum_{ET_n \in C_i^{(m)}} ET_n \quad (29)$$

where $|C_i^{(m)}|$ is the number of event-type distributions in the i-th cluster.

For each iteration m, Equation (28) is used to determine if a event-type distribution $ET_n$ belong to the i-th cluster followed by computing the cluster center according to Equation (29). The computational operations represented by Equations (28) and (29) are repeated for each value of m until the event-type distributions assigned to the k clusters do not change. The resulting clusters are represented by:

$$C_i = \{ET_p\}_p^{N_i} \quad (30)$$

where
$N_i$ is the number of data points in the cluster $C_i$;
i=1, 2, ..., k; and
p is a cluster data point subscript.

K++ means clustering, or Gaussian-based clustering, can be used to optimize the number of k centroids of k clusters of event-type distributions in the M-dimensional space. For example, k-means cluster may be started with k=1 cluster centers and k++ means clustering or Gaussian-based clustering are applied to k-means clustering to optimize the number of clusters.

Figure 15:
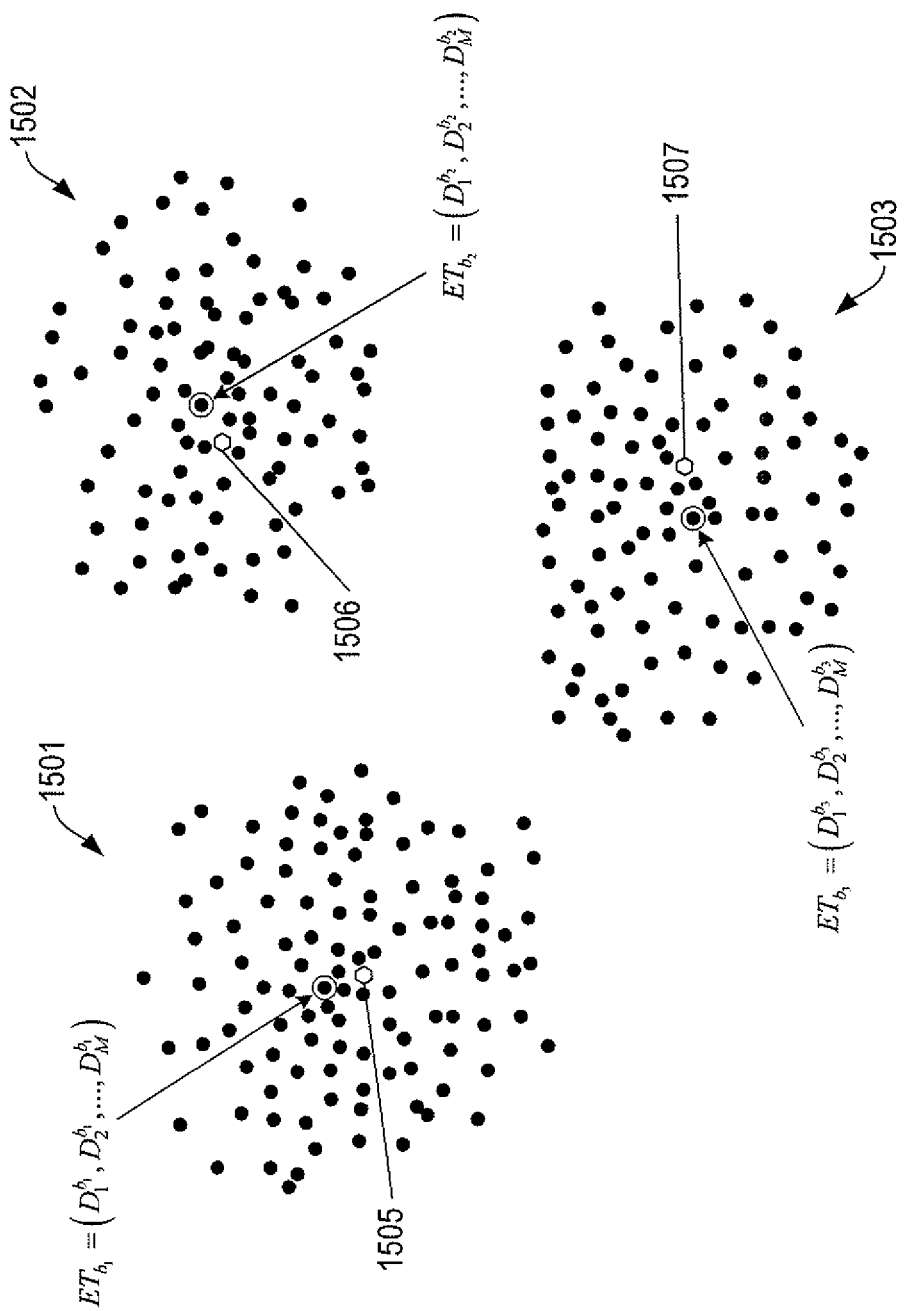
FIG. 15 shows an example of three clusters of event-type distribution clusters for an event source that operates in three different normal states.

FIG. 15 shows an example of three event-type distribution clusters 1501-1503 (i.e., k=3) in an M-dimensional space for an event source that operates in three different normal states. Unshaded hexagonal-shaped dots 1505-1507 represent centroids the clusters 1501-1503. A baseline event-type distribution computed for each cluster is the event-type distribution with the smallest LOF of event-type distributions in the cluster, as described above with reference to FIGS. 13A-13B and Equations (14)-(21). Alternatively, a baseline event-type distribution computed for each cluster is the event-type distribution with the minimum average distance to the other event-type distributions within the same cluster, as described above with reference to Equation (22). Circled data points 1505-1507 are baseline event-event distributions for each cluster. The normal discrepancy radius is computed for each cluster according to Equations (25a)-(25c) or Equation (26).

When a run-time event-type distribution $ET_{rt}$ violates a normal discrepancy radius, as described above with reference to Equations (13b) and (26c), a mismatch between the relative frequencies of each event type of the run-time event-type distribution $ET_{rt}$ and the baseline event-type distribution $ET_b$. For each event type, m=1, 2, ..., M, an event-type mismatch is computed as follows:

$$mis_m = |D_m^{rt} - D_m^b| \quad (31)$$

The event-type mismatches can be rank ordered from largest to smallest and displayed on system administrators console in order to enable a system administrator to observe how the event types have changed when the event source enters an abnormal state.

Figure 16A:
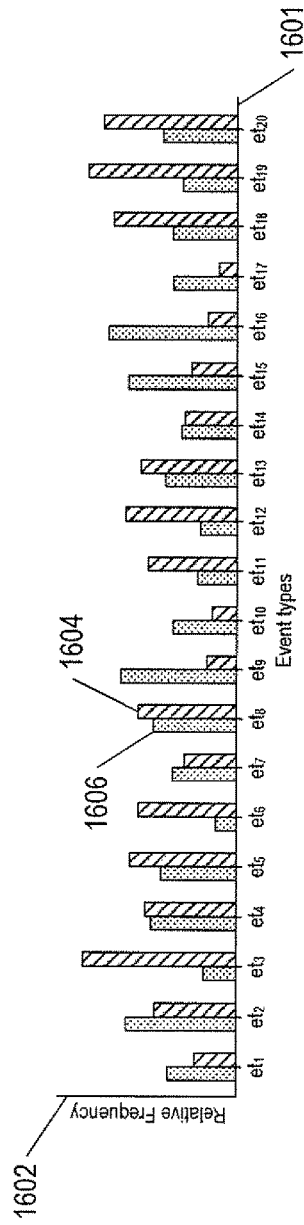
FIG. 16A shows a plot of an example run-time event-type distribution and a baseline event-type distribution for twenty event types.
Figure 16B:
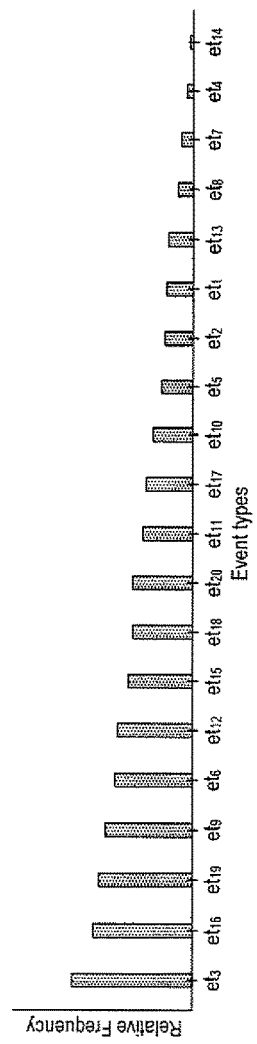
FIG. 16B shows a plot of rank ordered absolute values of event-type mismatches computed between relative frequencies of the run-time and baseline event types of FIG. 16A.
Figure 16C:
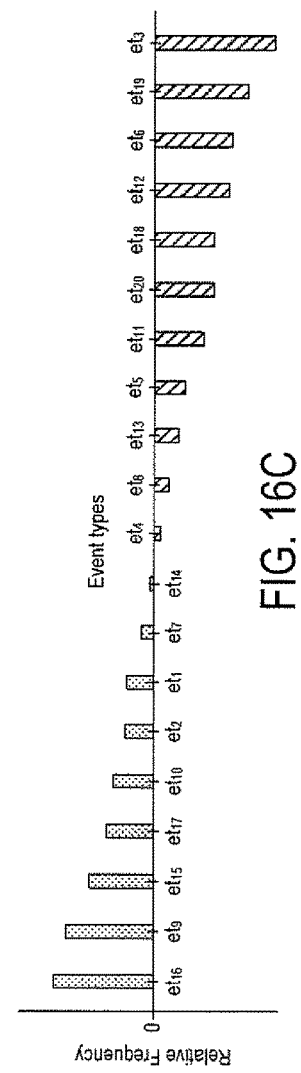
FIG. 16C shows a plot of event-type mismatches rank ordered from largest positive value to largest negative value of the run-time and baseline event types of FIG. 16A.

FIG. 16A shows a plot of an example run-time event-type distribution $ET_{rt}$ and a baseline event-type distribution $ET_b$ for twenty event types. The run-time event-type distribution is substantially different from the baseline event-type distribution and has violated a corresponding normal discrepancy radius as described above. Horizontal axis 1601 represents a range of the event types. Vertical axis 1602 represents a range of relative frequencies. Hash-marked bars, such as bar 1604, represent the relative frequency of the baseline event types. Shaded bars, such as bar 1606, represent the relative frequency of the run-time even types. FIG. 16B shows a plot of rank ordered absolute values (i.e., $|mis_m|$) of the event-type mismatches computed between the relative frequencies of the event types. Each bar represents an absolute value of an event-type mismatch. The absolute values are displayed in rank order from largest to smallest. For example, event types $et_3$ and $et_{16}$ experienced the greatest change in frequency while event types $et_4$ and $et_{14}$ experienced the smallest change in frequency. FIG. 16C shows a plot of event-type mismatches rank ordered from largest positive value to largest negative value. The plot in FIG. 16C reveals that event types $et_3$ decreased and event types $et_{16}$ increased in frequency. Example plots in FIGS. 16A-16C may be displayed on a system administration console to enable system administrators visually inspection of how event types generated by an event source change in transitioning from a normal state to an abnormal state. The event messages of event types with the largest magnitude event-type mismatch may be collected and displayed to enable a system administrator an opportunity to investigate and trouble shoot the source of the abnormality.

The methods described below with reference to FIGS. 17-24 are stored in one or more data-storage devices as machine-readable instructions that when executed by one or more processors of the computer system shown in FIG. 2 to detect abnormal behavior of an event sources.

Figure 17:
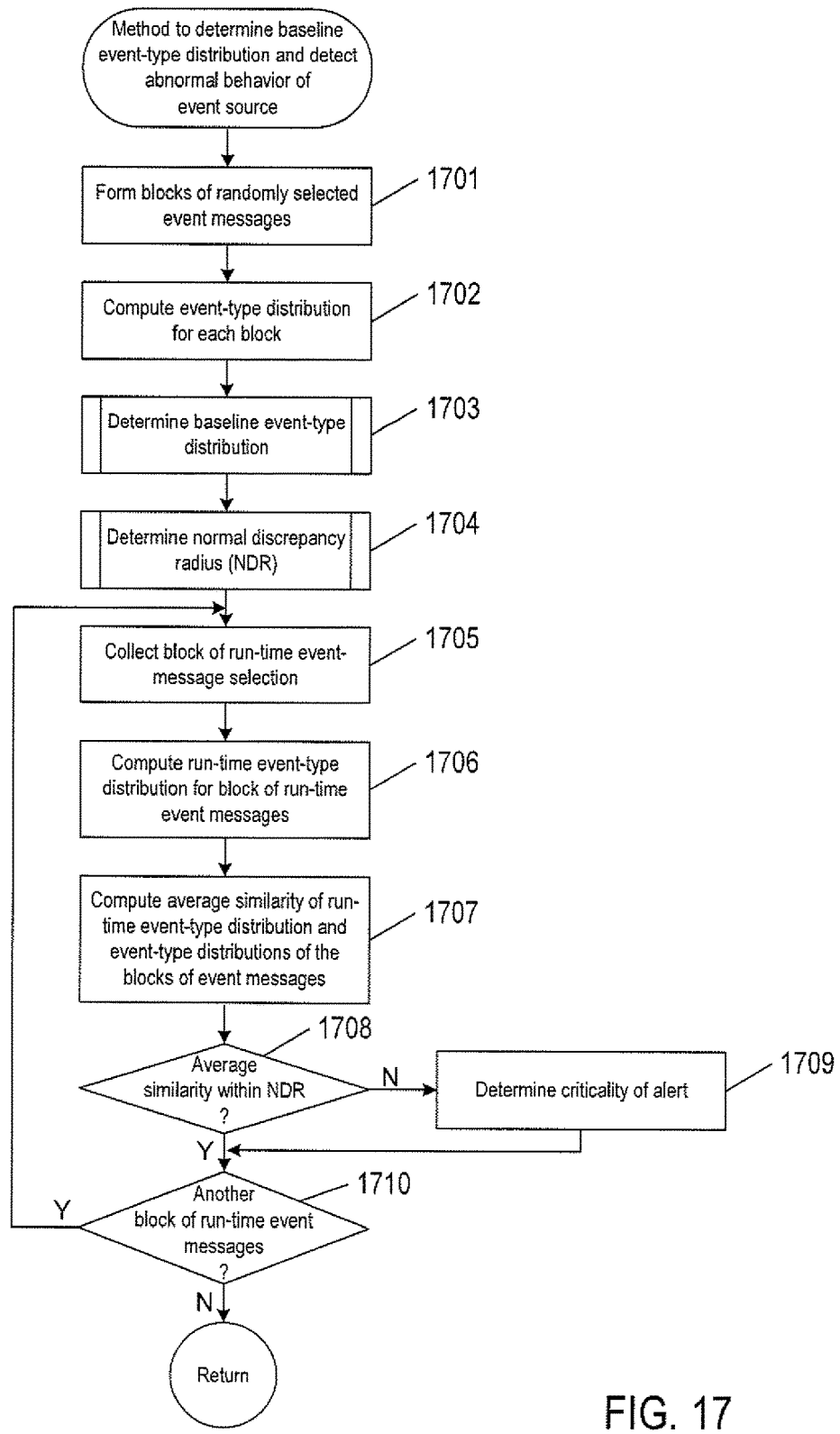
FIG. 17 shows control-flow diagram of a method to determine a baseline event-type distribution and detect abnormal behavior of an event source.

FIG. 17 shows control-flow diagram of a method to determine a baseline event-type distribution and detect abnormal behavior of an event source. In block 1701, blocks of randomly selected event messages generated by an event source are formed as described above with reference to FIG. 8. The number N of blocks of event messages may be determined by the normal state probability P, which is the percentage of the time the event source maintains a normal state. Using the normal state probability, the number of blocks N is computed using the cumulative binomial distribution as described above with reference to Equation (14b). In block 1702, an event-type distribution is computed for each block of event messages formed in the block 1701, as described above with reference to FIG. 9. In block 1703, a routine "determine baseline event-type distribution" is called to compute a baseline even-type distribution. In block 1704, a routine "determine normal discrepancy radius" is called. In block 1705, a block of run-time event messages are collected as described above with reference to FIG. 11. In block 1706, a run-time event-type distribution is computed for the block of run-time event messages as described above with reference to FIG. 9. In block 1707, an average similarity of the run-time event-type distribution and the event-type distributions of each block of event messages is computed, as described above with reference to Equation (12). In decision block 1708, when the average similarity of the run-time event-type distribution is not within the normal discrepancy radius threshold of the event-type distributions, as described above with reference to Equation (13b), control flows to block 1707. In block 1709, an alert is generated and the criticality of the alert is determined as described above with reference to Equations (13c) and (26d). In decision block 1710, when another block of run-time event messages is received, control flows back to block 1705.

FIG. 18 shows a control-flow diagram of the routine "determine baseline event-type distribution" called in block 1703 of FIG. 17. In block 1801, a maximum entropy $H_{max}$ is initialized to zero. A loop beginning with block 1802 repeats the computational operations of blocks 1803-1806 for each event-type distribution determined in block 1702 of FIG. 17. In block 1803, an entropy is computed for each event-type distribution as described above with reference to Equation (3). In decision block 1804, when the entropy computed in block 1803 is greater than the parameter $H_{max}$, control flows to block 1805. Otherwise control flows to block 1806. In block 1805, maximum entropy is reassigned the entropy computed in block 1803. In decision block 1806, when all event-type distributions have been considered control flows to block 1807. In block 1807, the event-type distribution with maximum entropy is identified as baseline event-type distribution.

FIG. 19 shows a control-flow diagram of the routine "determine normal discrepancy radius" called in block 1704 of FIG. 17. In block 1901, an average similarity is computed for each event-type distribution as described above with reference to FIG. 10A and Equation (8). In block 1902, the L largest average similarities are rank ordered, where L is determined based on the cumulative binomial distribution, as described above with reference to Equation (14b). In block 1903, determine the maximum and minimum average similarities of the L largest average similarities, as described above with reference to FIG. 10B. In block 1904, compute a normal discrepancy radius as a difference between the maximum and minimum average similarities as described above with reference to Equation (9).

Figure 20:
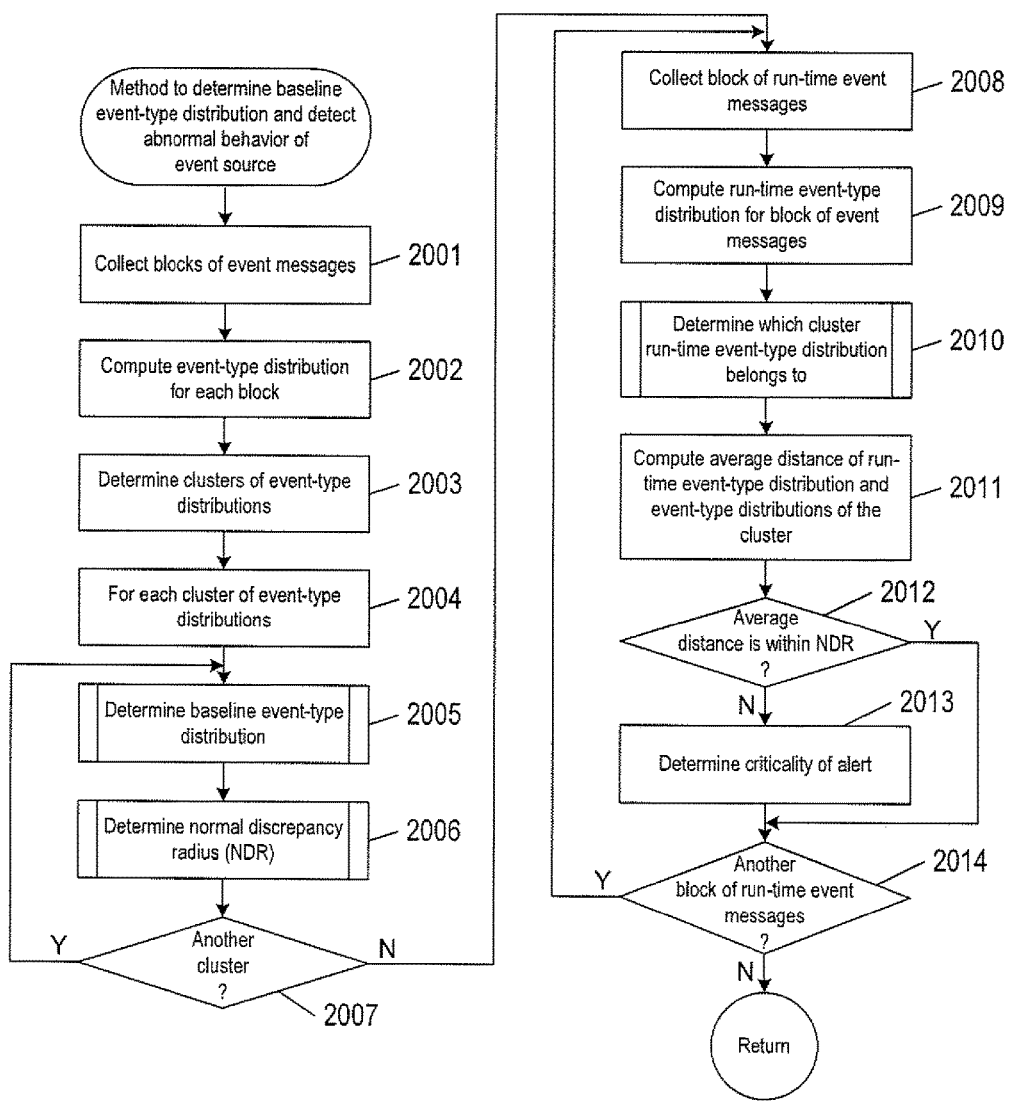
FIG. 20 shows a control-flow diagram of a method to determine a baseline event-type distribution and detect abnormal behavior of an event source.

FIG. 20 shows a control-flow diagram of a method to determine a baseline event-type distribution and detect abnormal behavior of an event source. In block 2001, blocks of event messages generated by an event source are collected as described above with reference to FIG. 12. In block 2002, an event-type distribution is computed for each block of event messages as described above with reference to FIGS. 9 and 12. In block 2003, clusters of event-type messages that correspond to different normal states are determined as described above with reference to Equations (28) and (29). A loop beginning with block 2004 repeats the operations of blocks 2005 and 2006 for each cluster of event-type distributions. In block 2005, a routine "determine baseline event-type distribution" is called to compute a baseline even-type distribution. In block 2006, a routine "determine normal discrepancy radius" is called. In decision block 2007, control flows to block 2008 when blocks 2005 and 2006 have been repeated for each cluster of event-type distributions. In block 2008, a block of run-time event messages are collected as described above with reference to FIG. 11. In block 2009, a run-time event-type distribution is computed for the run-time event messages as described above with reference to FIG. 9. In block 2010, a routine "determine which cluster run-time event-type distribution belongs to" is called. In block 2011, average distance from run-time distribution to event-type distributions in the cluster is computed, as described above with reference to Equation (26b). In decision block 2012, when the average distance of the run-time event-type distribution is not within the normal discrepancy radius of the cluster associated with the run-time event-type distribution, control flows to block 2013. In block 2013, an alert is generated and the criticality of the alert is as described above with reference to Equations (26d) and (26e). In decision block 2014, when another block of run-time event messages are received, control flows back to block 2008.

Figure 21:
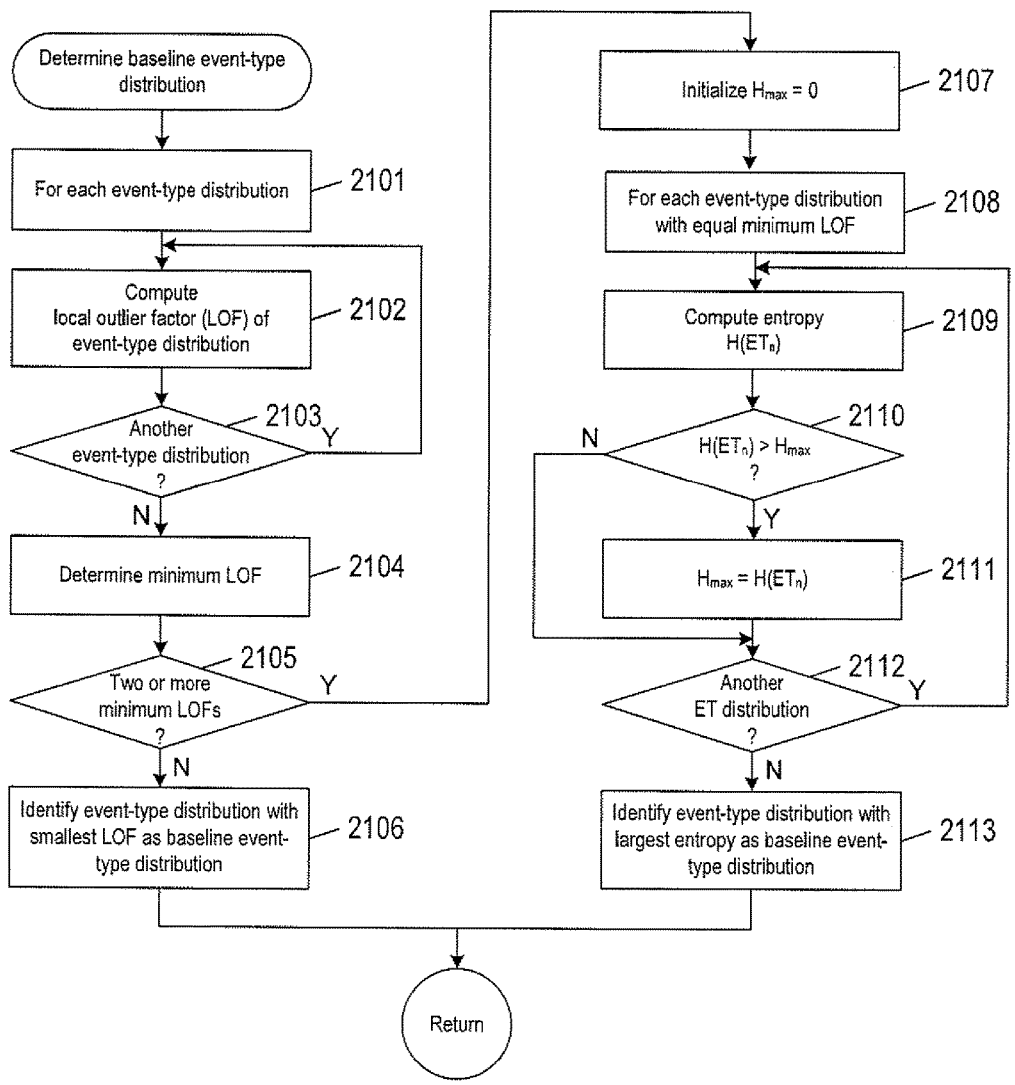
FIG. 21 shows a control-flow diagram of the routine "determine baseline even-type distribution" called in FIG. 20.

FIG. 21 shows a control-flow diagram of the routine "determine baseline even-type distribution" called in block 2005 of FIG. 20. A loop beginning with block 2101 repeats the operation represented by block 2102 for each event-type distribution. In block 2102, an LOF is computed for each event-type distribution as described above with reference to Equations (15)-(21). In decision block 2103, when an LOF has been computed for each event-type distribution, control flows to block 2104. In block 2104, a minimum LOF determined from the LOF computed in block 2102. In decision block 2105, when two or more minimum LOFs are equal, control flows to block 2107. Otherwise, control flows to block 2106. In block 2106, the event-type distribution with the minimum LOF is identified as the baseline event-type distribution. In block 2107, a maximum entropy $H_{max}$ is initialized to zero. A loop beginning with block 2108 repeats the computational operations of blocks 2109-2112 for each event-type distribution. In block 2109, an entropy is computed for each event-type distribution as described above with reference to Equation (3). In decision block 2110, when the entropy computed in block 2109 is greater than the maximum entropy $H_{max}$, control flows to block 2111. Otherwise control flows to block 2112. In block 2111, the maximum entropy is reassigned the entropy computed in block 2109. In decision block 2112, when all event-type distributions have been considered control flows to block 2113. In block 2113, the event-type distribution with minimum LOF and maximum entropy is identified as the baseline event-type distribution.

Figure 22:
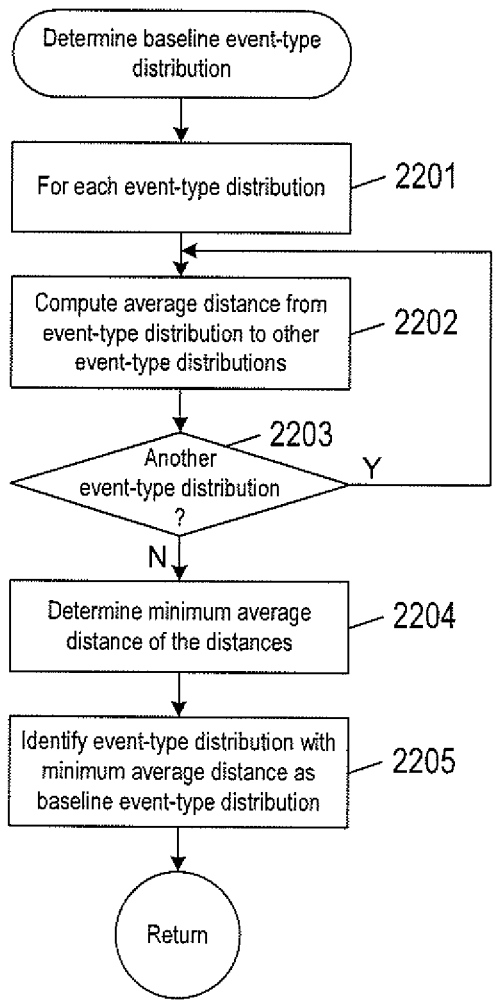
FIG. 22 shows a control-flow diagram of the routine "determine baseline even-type distribution" called in FIG. 20.

FIG. 22 shows a control-flow diagram of the routine "determine baseline even-type distribution" called in block 2005 of FIG. 20. A loop beginning with block 2201 repeats the computational operation represented by block 2202 for each event-type distribution computed in block 2002 of FIG. 20. In block 2202, an average distance from the event-type distribution to other event-type distributions is computed as described above with reference to FIG. 14 and Equation (23). In decision block 2203, when an average distance has been computed for each event-type distribution control flows to block 2204. In block 2204, a minimum average distance is determined from the distances. In block 2205, the event-type distribution with the minimum average distance is identified as the baseline event-type distribution.

Figure 23:
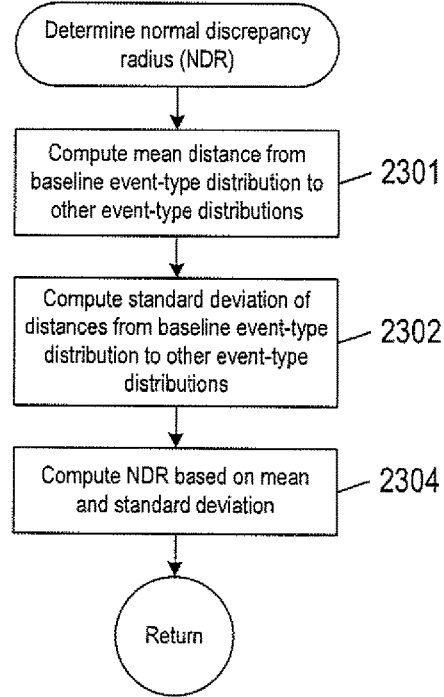
FIG. 23 shows a control-flow diagram of the routine "determine normal discrepancy radius" called in FIG. 20.

FIG. 23 shows a control-flow diagram of the routine "determine normal discrepancy radius" called in block 2006 of FIG. 20. In block 2301, a mean distance is computed as from the baseline event-type distribution to the other event-type distributions, as described above with reference to Equation (24a). In block 2302, a standard deviation of distances is computed as described above with reference to Equation (24b). In block 2303, a normal discrepancy radius is computed as described above with reference to Equation (25) or Equation (26).

Figure 24:
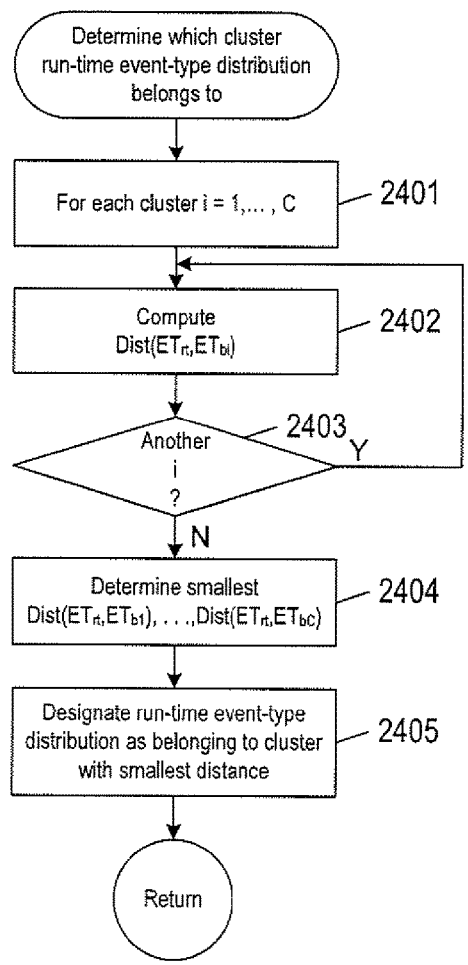
FIG. 24 shows a control-flow diagram of the routine "determine which cluster run-time event-type distribution belongs to" called in FIG. 20.

FIG. 24 shows a control-flow diagram of the routine "determine which cluster run-time event-type distribution belongs to" called in block 2010 of FIG. 20. A loop beginning with block 2401 repeats the computational operation of block 2402 for each cluster determined in block 2003 of FIG. 20. In block 2402, a distance is computed from the run-time event-type distribution and the baseline event-type distribution of the cluster using Equation (16) or Equation (17). In decision block 2403, control flows to block 2404, when the distance has been computed for the clusters. In block 2404, determined minimum distance of the distances computed in block 2402. In block 2405, run-time event-type distribution is identified as belonging to the cluster with the smallest distance.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated method stored in one or more data-storage devices and executed using one or more processors of a computer system to determine a baseline event-type distribution and detect abnormal behavior of an event source, the method comprising:
   computing an event-type distribution for each block of event messages generated by an event source;
   determining a baseline event-type distribution of the event-type distributions, the baseline event-type distribution having the largest entropy of the event-type distributions;
   computing a normal discrepancy radius threshold of the event-type distributions centered at the baseline event-type distribution based on the baseline event-type distribution and the event-type distributions;
   computing a run-time event-type distribution from a block of run-time event messages generated by the event source;
   computing an average similarity of the run-time event-type distribution with the event-type distributions of each block of event messages; and
   generating an alert indicating abnormal behavior of the event source, when the average similarity of the run-time event-type distribution is outside the normal discrepancy radius threshold.

2. The method of claim 1 further comprises forming each block of event messages by randomly selected event messages from an event log of the event source.

3. The method of claim 1 wherein determining a baseline event-type distribution of the event-type distributions comprises:
   computing an entropy for each event-type distribution;
   determining a maximum entropy of the entropies computed for each event-type distribution; and
   identifying the event-type distribution with the maximum entropy as the baseline event-type distribution.

4. The method of claim 1 wherein computing the entropy for each event-type distribution comprises computing candidate baseline event-type distributions from randomly sampled event messages generated by the event source based on a cumulative binomial distribution for a percentage of time the event source is in a normal state.

5. The method of claim 1 wherein computing the normal discrepancy radius threshold of the event-type distributions comprises:
   computing a similarity between each event-type distribution and other event-type distributions;
   computing an average similarity of each event-type distribution based on the similarities computed between the event-type distribution and the event-type distributions;
   rank order the average similarities obtained for event-type distribution from maximum to minimum average similarities;
   calculating a normal discrepancy radius as a difference between the maximum and minimum average similarities; and
   calculating a normal discrepancy radius threshold as a difference between the average similarity of the baseline event-type distribution and normal discrepancy radius.

6. The method of claim 1 wherein computing the average similarity of the run-time event-type distribution comprises:
   computing a similarity between the run-time event-type distribution and the event-type distributions; and
   computing an average similarity of run-time event-type distribution based on the similarities computed between the run-time event-type distribution and the event-type distributions.

7. The method of claim 1 wherein generating the alert indicating abnormal behavior of the event source further comprises determining a severity of the alert when the average similarity of the run-time event-type distribution is less than a severity-level threshold.

8. A system to determine a baseline event-type distribution and detect abnormal behavior of an event source, the system comprising:
one or more processors;
one or more data-storage devices; and
machine-readable instructions stored in the one or more data-storage devices that when executed using the one or more processors controls the system to carry out
computing an event-type distribution for each block of event messages generated by an event source;
determining a baseline event-type distribution of the event-type distributions, the baseline event-type distribution having the largest entropy of the event-type distributions;
computing a normal discrepancy radius of the event-type distributions based on the baseline event-type distribution and the event-type distributions;
computing a run-time event-type distribution from a block of run-time event messages generated by the event source;
computing an average distance from the run-time event-type distribution to the event-type distributions of each block of event messages; and
generating an alert indicating abnormal behavior of the event source, when the average distance of the run-time event-type distribution is outside the normal discrepancy radius.

9. The system of claim 8 wherein determining the baseline event-type distribution of the event-type distributions comprises:
computing a local outlier factor for each even-type distribution;
determining a minimum local outlier factor; and
identifying the baseline event-type distribution as the event-type distribution with the minimum local outlier factor.

10. The system of claim 9 wherein determining the minimum local outlier factor comprises:
when two or more local outlier factors are equally minima of the local outlier factors,
computing an entropy of each event-type distribution of the minima of local outlier factors, and
identifying the baseline event-type distribution as the event-type distribution with the largest entropy of the event-type distribution of the minima of local outlier factors.

11. The system of claim 8 wherein determining the baseline event-type distribution of the event-type distributions comprises:
computing a distance between each pair of event-type distributions;
for each event-type distribution, computing an average distance from the event-type distribution to the other event-type distributions based on the distances computed between the event-type distribution and the event-type distributions;
determining a minimum average distance of the average distances; and
identifying the baseline event-type distribution as the event-type distribution with the minimum average distance.

12. The system of claim 8 wherein computing the normal discrepancy radius of the event-type distributions comprises:
computing a distance between the baseline event-type distribution and each of the event-type distributions;
computing a mean distance of distances between the baseline event-type distribution and the event-type distributions;
computing a standard deviation of distances between the baseline event-type distribution and the event-type distributions; and
computing a normal discrepancy radius as centered at the mean distance of distances between the baseline event-type distribution and the event-type distributions.

13. The system of claim 8 wherein generating the alert indicating abnormal behavior of the event source further comprises determining a severity of the alert when the average distance of the run-time event-type distribution is less than or greater than a severity-level threshold.

14. A non-transitory computer-readable medium encoded with machine-readable instructions that implement a method carried out by one or more processors of a computer system to perform the operations of
computing an event-type distribution for each block of event messages generated by an event source;
determining a baseline event-type distribution of the event-type distributions, the baseline event-type distribution having the largest entropy of the event-type distributions;
computing a normal discrepancy radius of the event-type distributions based on the baseline event-type distribution and the event-type distributions;
computing a run-time event-type distribution from a block of run-time event messages generated by the event source;
computing an average distance from the run-time event-type distribution to the event-type distributions of each block of event messages; and
generating an alert indicating abnormal behavior of the event source, when the average distance of the run-time event-type distribution is outside the normal discrepancy radius.

15. The medium of claim 14 wherein determining the baseline event-type distribution of the event-type distributions comprises:
computing a local outlier factor for each even-type distribution;
determining a minimum local outlier factor; and
identifying the baseline event-type distribution as the event-type distribution with the minimum local outlier factor.

16. The medium of claim 15 wherein determining the minimum local outlier factor comprises:
when two or more local outlier factors are equally minima of the local outlier factors,
computing an entropy of each event-type distribution of the minima of local outlier factors, and
identifying the baseline event-type distribution as the event-type distribution with the largest entropy of the event-type distribution of the minima of local outlier factors.

17. The medium of claim 14 wherein determining the baseline event-type distribution of the event-type distributions comprises:
computing a distance between each pair of event-type distributions;

for each event-type distribution, computing an average distance from the event-type distribution to the other event-type distributions based on the distances computed between the event-type distribution and the event-type distributions;

determining a minimum average distance of the average distances; and identifying the baseline event-type distribution as the event-type distribution with the minimum average distance.

18. The medium of claim 14 wherein computing the normal discrepancy radius of the event-type distributions comprises:

computing a distance between the baseline event-type distribution and each of the event-type distributions;

computing a mean distance of distances between the baseline event-type distribution and the event-type distributions;

computing a standard deviation of distances between the baseline event-type distribution and the event-type distributions; and computing a normal discrepancy radius as centered at the mean distance of distances between the baseline event-type distribution and the event-type distributions.

19. The medium of claim 14 wherein generating the alert indicating abnormal behavior of the event source further comprises determining a severity of the alert when the average distance of the run-time event-type distribution is less than or greater than a severity-level threshold.

\* \* \* \* \*